(12) United States Patent
Jung et al.

(10) Patent No.: US 12,549,099 B2
(45) Date of Patent: Feb. 10, 2026

(54) HYBRID VOLTAGE DIVIDER AND BUCK CONVERTER CIRCUIT

(71) Applicant: QUALCOMM Incorporated, San Diego, CA (US)

(72) Inventors: Sanghwa Jung, Los Gatos, CA (US); Ahmed Abdelmoaty, San Jose, CA (US); Chunping Song, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/465,757

(22) Filed: Sep. 12, 2023

(65) Prior Publication Data

US 2025/0088100 A1    Mar. 13, 2025

(51) Int. Cl.
*H02M 3/07* (2006.01)
*H02M 1/00* (2006.01)
*H02M 3/158* (2006.01)

(52) U.S. Cl.
CPC ........... *H02M 3/07* (2013.01); *H02M 1/0025* (2021.05); *H02M 1/0045* (2021.05); *H02M 3/1584* (2013.01)

(58) Field of Classification Search
None
See application file for complete search history.

(56) References Cited

U.S. PATENT DOCUMENTS

| 9,444,329 | B2 * | 9/2016 | Arno | H02M 3/158 |
| 10,833,637 | B2 * | 11/2020 | Khlat | H02M 3/07 |
| 10,985,654 | B2 * | 4/2021 | Nomiyama | H02M 3/158 |
| 11,522,452 | B2 * | 12/2022 | Jung | H02J 7/007 |
| 11,705,812 | B2 * | 7/2023 | Yen | H02M 1/15 |
| | | | | 323/282 |
| 11,791,721 | B2 * | 10/2023 | Chen | H02J 7/007 |
| | | | | 713/300 |
| 11,831,241 | B2 * | 11/2023 | Jung | H02M 1/0032 |
| 2020/0321860 | A1 | 10/2020 | Amin et al. | |
| 2021/0036604 | A1 * | 2/2021 | Khlat | H02M 3/07 |
| 2021/0367511 | A1 | 11/2021 | Liu et al. | |
| 2022/0278611 | A1 * | 9/2022 | Tsuda | H02M 1/007 |
| 2022/0329152 | A1 * | 10/2022 | Li | H02M 3/1582 |
| 2023/0155492 | A1 | 5/2023 | Zhao et al. | |

FOREIGN PATENT DOCUMENTS

EP    3709490 A1    9/2020

OTHER PUBLICATIONS

International Search Report and Written Opinion—PCT/US2024/044054—ISA/EPO—Dec. 19, 2024.

* cited by examiner

*Primary Examiner* — Jeffrey S Zweizig
(74) *Attorney, Agent, or Firm* — Patterson + Sheridan, L.L.P.

(57) ABSTRACT

Certain aspects of the present disclosure generally relate to a hybrid voltage divider and buck converter circuit. For example, certain aspects provide a power supply circuit, including: a first charge pump coupled between an input voltage (VIN) node of the power supply circuit and a charge pump output node of the power supply circuit, an inductive element having a first terminal coupled to the charge pump output node and a second terminal coupled to an output voltage (VOUT) node of the power supply circuit, and an output capacitive element coupled to the VOUT node of the power supply circuit.

13 Claims, 14 Drawing Sheets

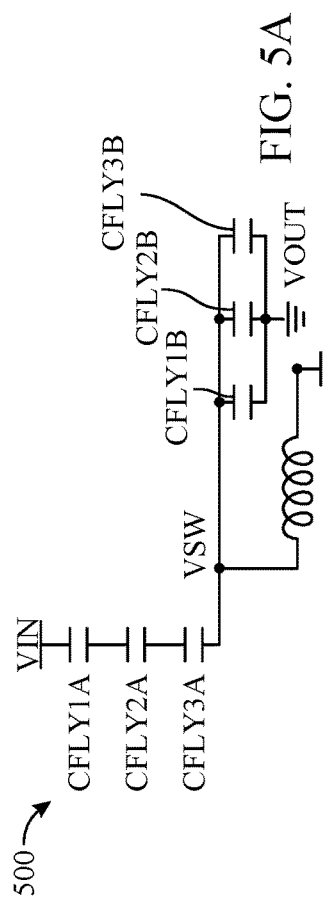
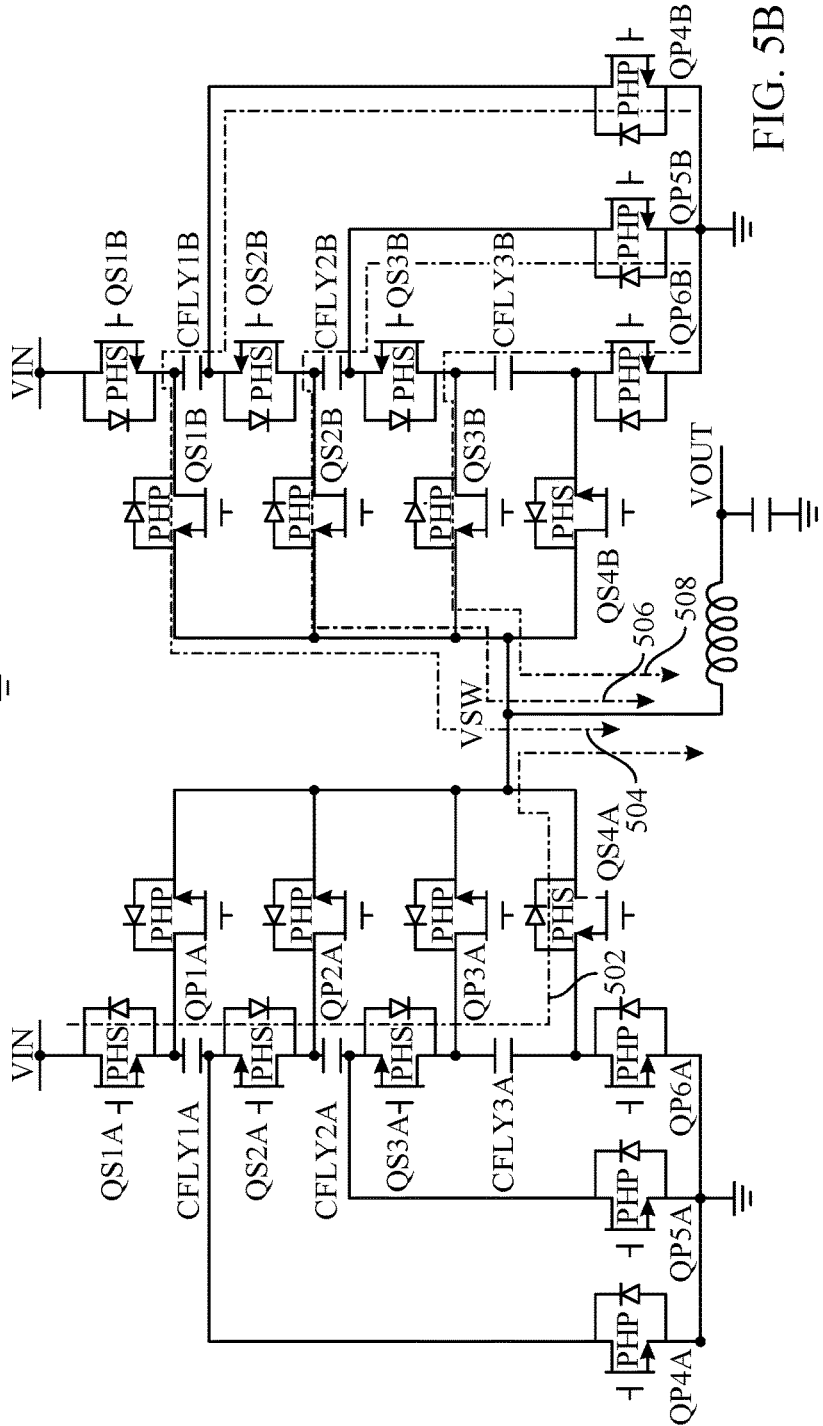
FIG. 5A
FIG. 5B

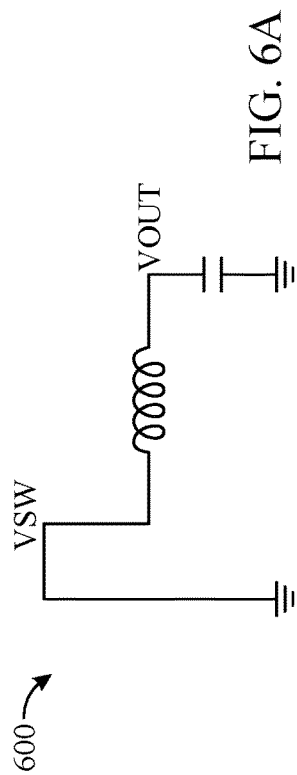
FIG. 6A
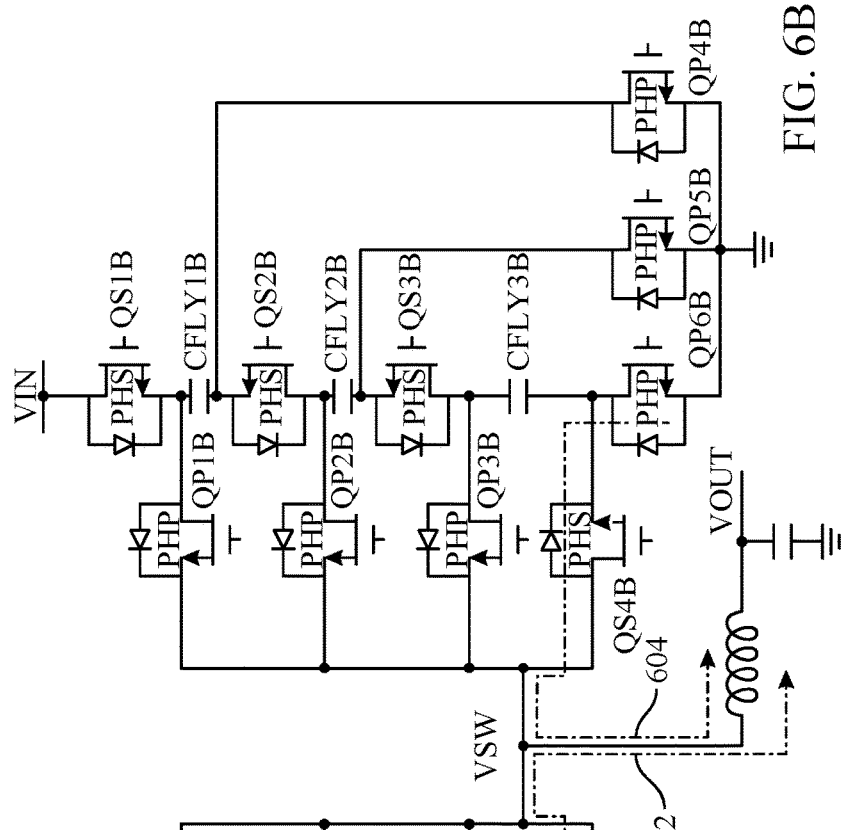
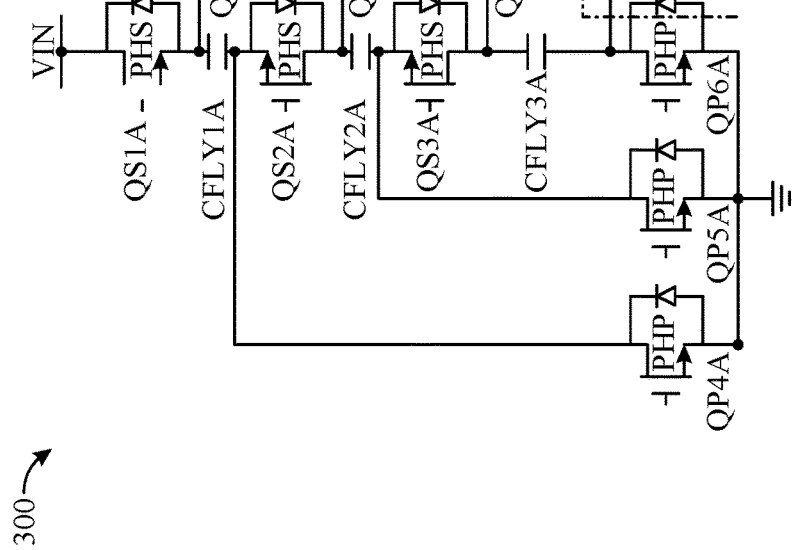
FIG. 6B

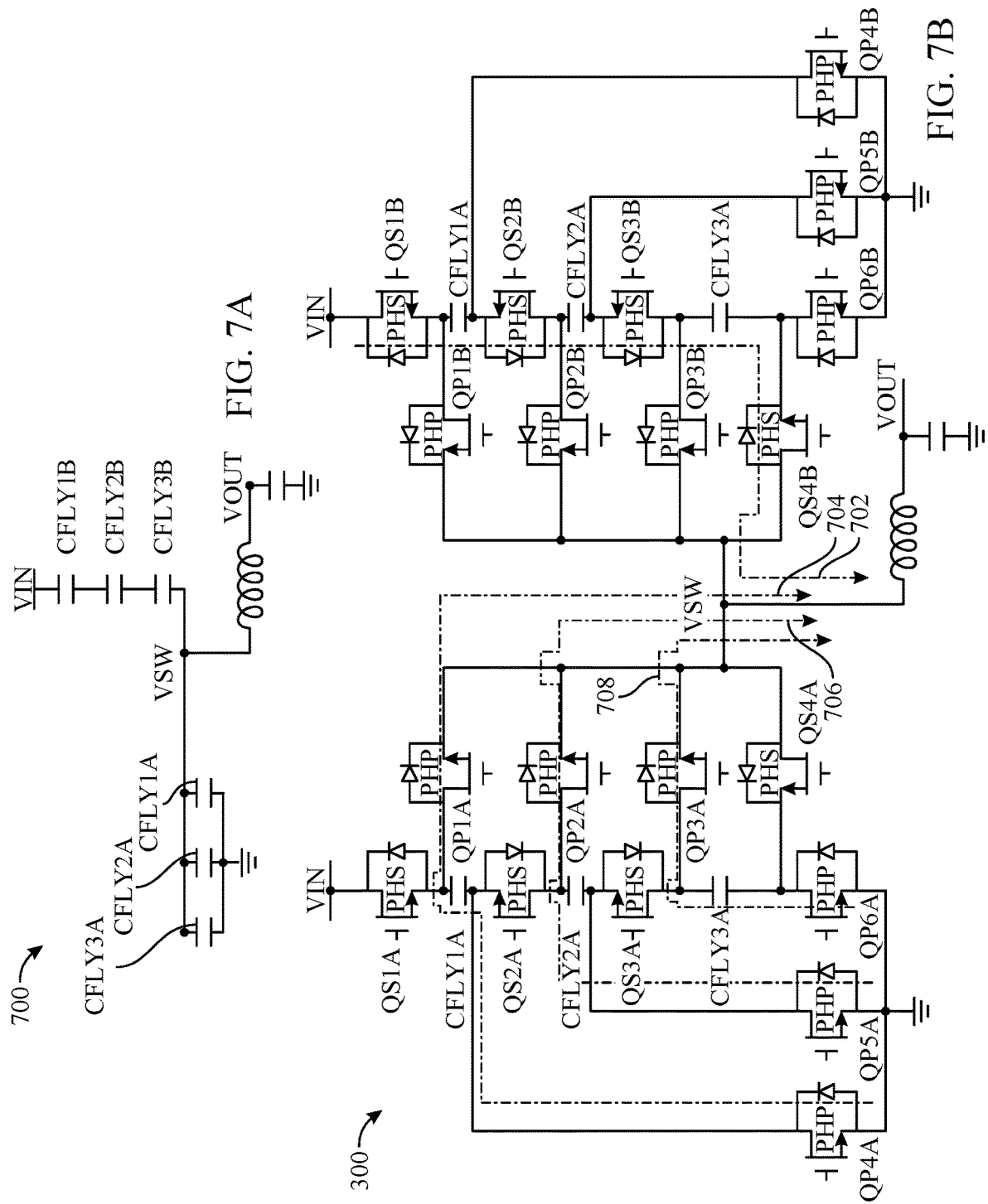

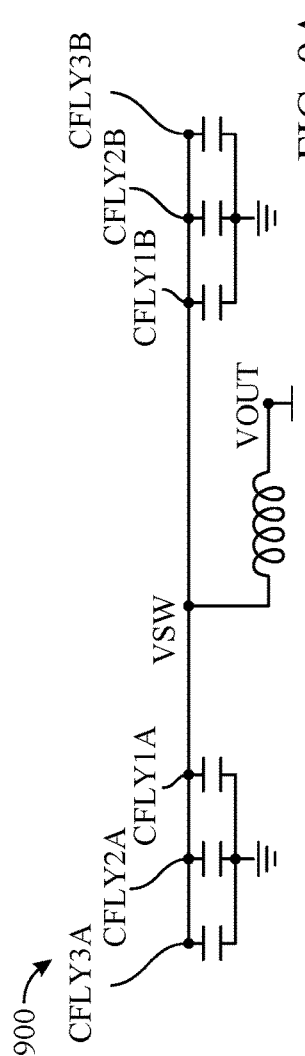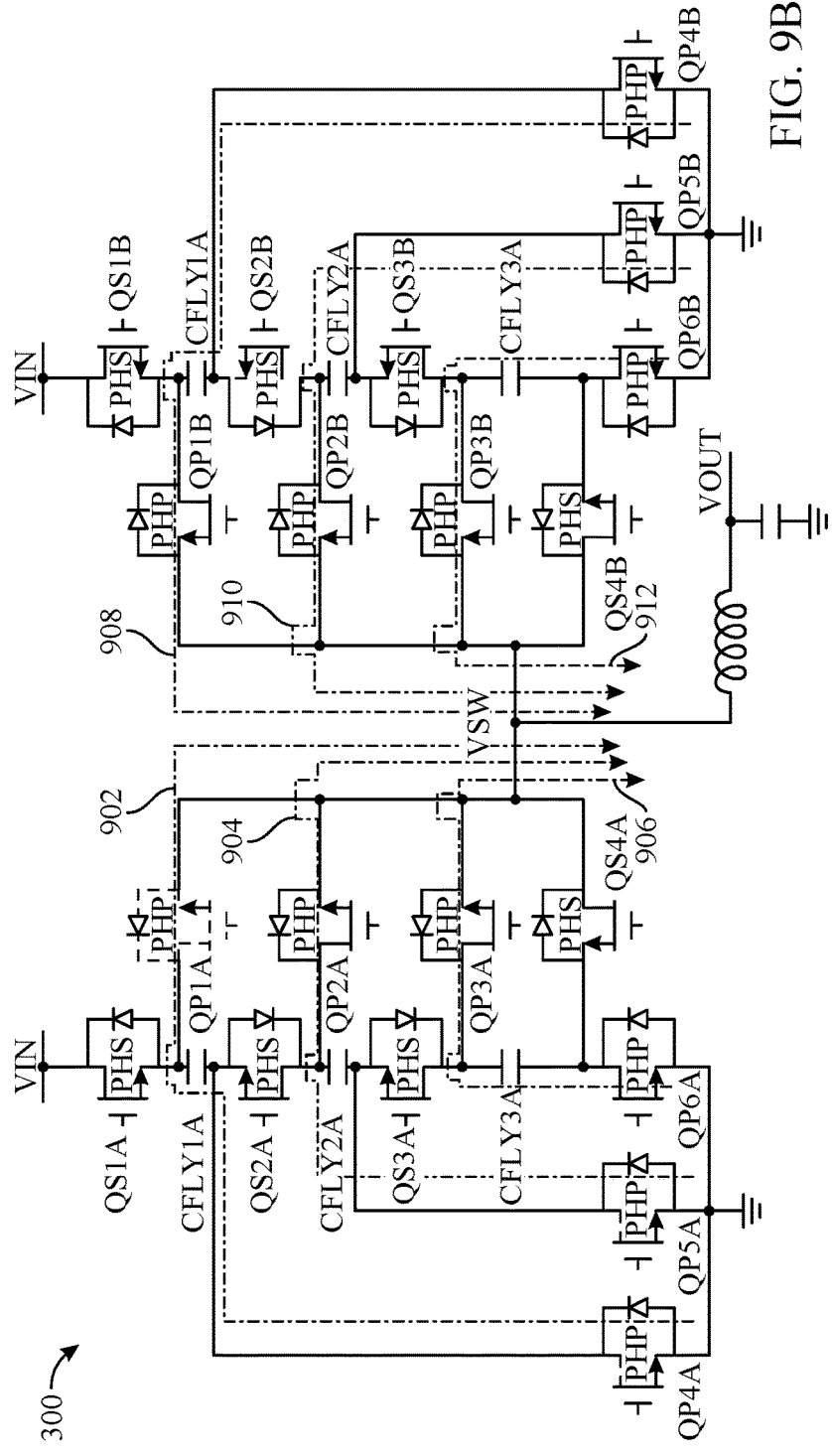
FIG. 9A
FIG. 9B

HYBRID VOLTAGE DIVIDER AND BUCK CONVERTER CIRCUIT

TECHNICAL FIELD

Certain aspects of the present disclosure generally relate to electronic circuits and, more particularly, to a hybrid voltage divider and buck converter circuit.

BACKGROUND

A voltage regulator may provide a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator (also known as a "switching converter" or "switcher") may be implemented, for example, by a switched-mode power supply (SMPS), such as a buck converter, a boost converter, a buck-boost converter, or a charge pump.

For example, a buck converter is a type of SMPS that may include: (1) a high-side switch coupled between a relatively higher voltage rail and a switching node, (2) a low-side switch coupled between the switching node and a relatively lower voltage rail, (3) and an inductor coupled between the switching node and a load. The high-side and low-side switches are typically implemented with transistors, although the low-side switch may alternatively be implemented with a diode.

Power management integrated circuits (power management ICs or PMICs) are used for managing the power scheme of a host system and may include and/or control one or more voltage regulators (e.g., buck converters and/or LDOs). A PMIC may be used in battery-operated devices, such as mobile phones, tablets, laptops, wearables, etc., to control the flow and direction of electrical power in the devices. The PMIC may perform a variety of functions for the device, such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure are directed towards a power supply circuit. The power supply circuit may include: a first charge pump coupled between an input voltage (VIN) node of the power supply circuit and a charge pump output node of the power supply circuit; an inductive element having a first terminal coupled to the charge pump output node and a second terminal coupled to an output voltage (VOUT) node of the power supply circuit; and an output capacitive element coupled to the VOUT node of the power supply circuit.

Certain aspects of the present disclosure are directed towards a power supply circuit. The power supply circuit may include a first series phase transistor coupled between a VIN node of the power supply circuit and a first flying capacitive element and a second series phase transistor coupled between the first flying capacitive element and a second flying capacitive element. The power supply circuit may also include: a third series phase transistor coupled between the second flying capacitive element and a charge pump output node; a first parallel phase transistor coupled between the first series phase transistor and the charge pump output node, and a second parallel phase transistor coupled between the second series phase transistor and the charge pump output node. The power supply circuit may also include: a third parallel phase transistor coupled between the first flying capacitive element and a reference potential node of the power supply circuit; and a fourth parallel phase transistor coupled between the second flying capacitive element and the reference potential node of the power supply circuit. The power supply circuit may also include an inductive element coupled between the charge pump output node and a VOUT node of the power supply circuit.

Certain aspects of the present disclosure include a method for operating a power supply circuit. The method may include: generating, via a first charge pump of the power supply circuit and during each of at least one powering phase of the power supply circuit, a voltage at a charge pump output node of the power supply circuit based on an input voltage of the power supply circuit; and coupling, during each of at least one freewheeling phase of the power supply circuit, the charge pump output node to a reference potential node after generating the voltage, where an inductive element is coupled between the charge pump output node and a VOUT node of the power supply circuit.

Certain aspects of the present disclosure include a power supply device. The power supply device generally includes: a first charge pump coupled between an input voltage (VIN) node of the power supply device and a charge pump output node of a power supply circuit; an inductive element having a first terminal coupled to the charge pump output node and a second terminal coupled to an output voltage (VOUT) node of the power supply circuit; an output capacitive element coupled to the VOUT node of the power supply circuit; and logic configured to: control, during each of at least one powering phase of the power supply circuit, the first charge pump to generate a voltage at the charge pump output node of the power supply circuit based on an input voltage at the VIN node of the power supply circuit; and control, during each of at least one freewheeling phase of the power supply circuit, the first charge pump to couple the charge pump output node to a reference potential node of the power supply circuit after generating the voltage.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5A illustrates an effective configuration of a voltage divider and buck converter circuit during a powering phase of a first out-of-phase state, in accordance with certain aspects of the present disclosure.

FIG. 5B illustrates current flow in a voltage divider and buck converter circuit during a powering phase of a first out-of-phase state, in accordance with certain aspects of the present disclosure.

FIG. 6A illustrates an effective configuration of the circuit during a freewheeling phase of a first out-of-phase state, in accordance with certain aspects of the present disclosure.

FIG. 6B illustrates current flow in a voltage divider and buck converter circuit during a freewheeling phase of a first out-of-phase state, in accordance with certain aspects of the present disclosure.

FIG. 7A illustrates an effective configuration of a voltage divider and buck converter circuit during a powering phase of a second out-of-phase state, in accordance with certain aspects of the present disclosure.

FIG. 7B illustrates current flow in a voltage divider and buck converter circuit during a powering phase of a second out-of-phase state, in accordance with certain aspects of the present disclosure.

FIG. 9A illustrates an effective configuration of a voltage divider and buck converter circuit during a powering phase of a second in-phase state, in accordance with certain aspects of the present disclosure.

FIG. 9B illustrates current flow in a voltage divider and buck converter circuit during a powering phase of a second in-phase state, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
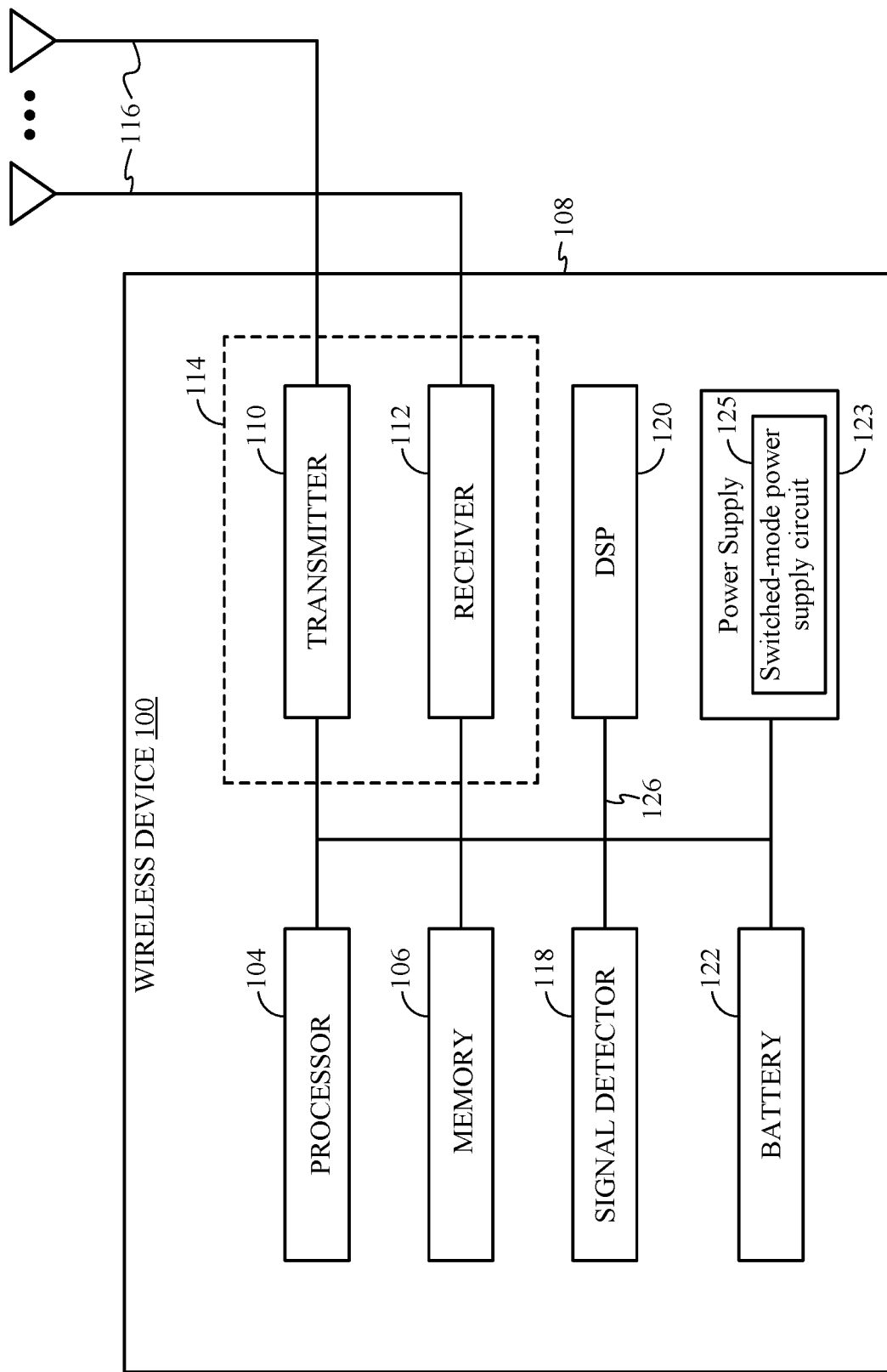
FIG. 1 illustrates a block diagram of an example device that includes a power supply system with at least one switched-mode power supply (SMPS) circuit, in which aspects of the present disclosure may be practiced.

Certain aspects of the present disclosure provide a hybrid voltage divider and buck converter circuit. For example, certain aspects may provide one or more charge pumps for generating a divided voltage at a voltage switching (VSW) node (also referred to herein as a "charge pump output node") during powering phases. An inductive element may be coupled between the VSW node and an output voltage (VOUT) node. The one or more charge pumps may switch between the powering phases and freewheeling phases (e.g., during which the VSW node is coupled to electrical ground), effectively performing buck operations to generate a regulated voltage at the VOUT node. In some aspects, multiple charge pumps may be used to generate the regulated voltage at the VOUT node. The hybrid voltage divider and buck converter circuit provides a smart phase control scheme. For example, the multiple charge pumps may be operated in different states, including out-of-phase states and in-phase states, providing uniform usage of charge pump transistors and voltage balancing for flying capacitive elements of the charge pumps. The hybrid voltage divider and buck converter circuit may be implemented with the same number of transistors as used for a charge pump, in some aspects. The duty cycle of the hybrid voltage divider and buck converter circuit may be controlled by a feedback loop as the flying capacitive elements of the hybrid voltage divider and buck converter circuit are balanced using phase control, as described in more detail herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatuses, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, an Internet of things (IoT) device, a wearable device, a virtual reality (VR) or augmented reality (AR) device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when the device is disconnected from an external power source). The device 100 may also include a power supply system 123 for managing the power from the battery (or from one or more power ports for receiving external power) to the various components of the device 100. At least a portion of the power supply system 123 may be implemented in one or more power management integrated circuits (power management ICs or PMICs) The power supply system 123 may perform a variety of functions for the device 100 such as DC-to-DC conversion, battery charging, power-source selection, voltage scaling, power sequencing, etc. For example, the power supply system 123 may include one or more power supply circuits, which may include a switched-mode power supply circuit 125. The switched-mode power supply circuit 125 may be implemented by any of various suitable switched-mode power supply circuit topologies, such as a three-level buck converter, a divide-by-two (Div2) charge pump, or an adaptive combination power supply circuit, which can switch between operating in a three-level buck converter mode and a two-level buck converter mode, as described below. In some aspects, the switched-mode power supply circuit 125 may be implemented as a hybrid voltage divider and buck converter, as described in more detail herein.

The various components of the device 100 may be coupled together by a bus system 126, which may include a power bus, a control signal bus, and/or a status signal bus in addition to a data bus. Additionally or alternatively, various combinations of the components of the device 100 may be coupled together by one or more other suitable techniques.

Example Power Supply Scheme

Figure 2:
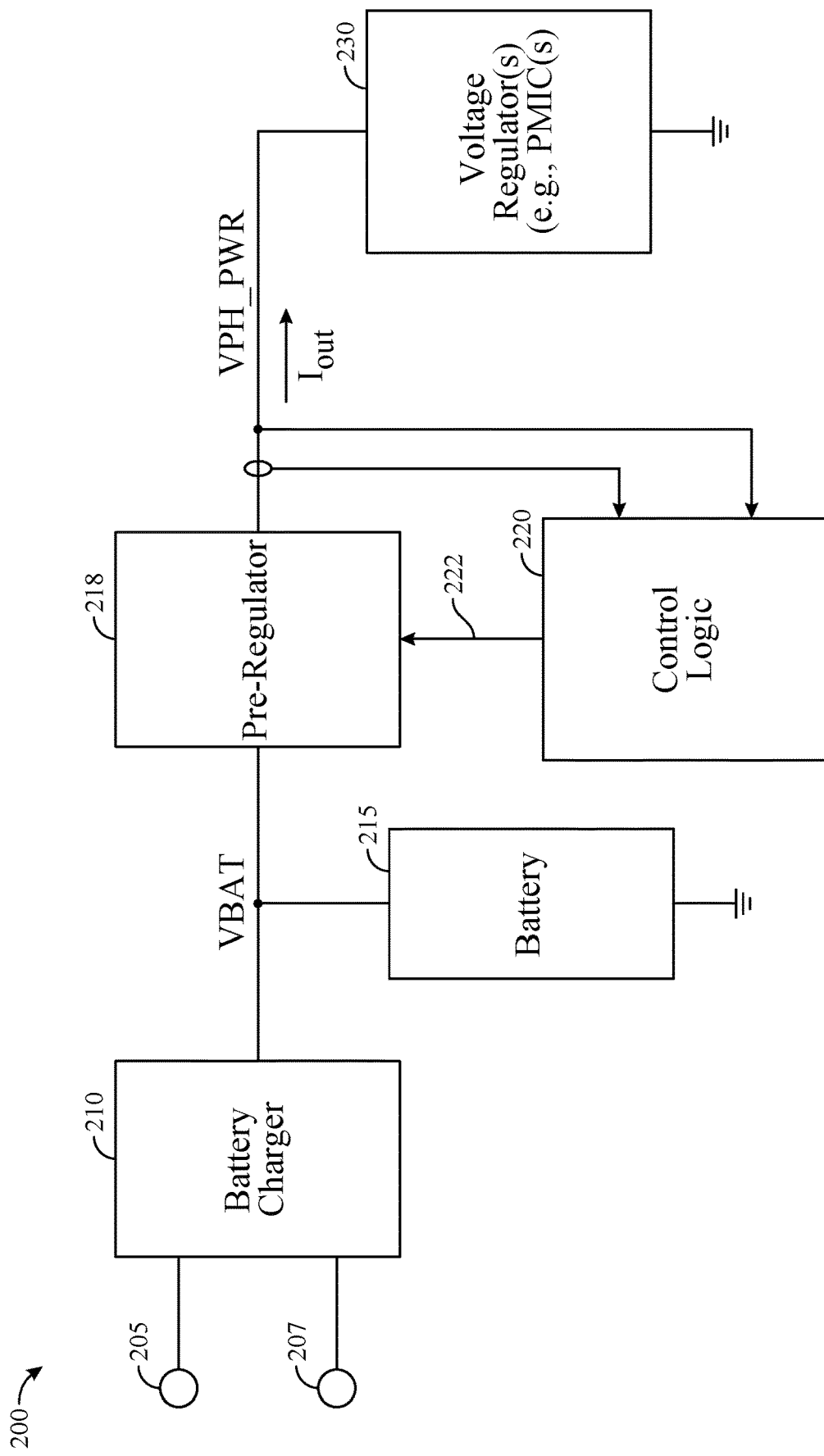
FIG. 2 is a block diagram of an example power supply scheme comprising a battery charging circuit, a battery circuit, and a pre-regulator for regulating power to one or more voltage regulators, in accordance with certain aspects of the present disclosure.

FIG. 2 is a block diagram of an example power supply scheme 200, in accordance with certain aspects of the present disclosure. The power supply scheme 200 includes a battery charging circuit 210, a battery circuit 215, a pre-regulator 218, and one or more voltage regulators 230. Control logic 220 may receive various inputs (e.g., voltage and/or current feedback signals) and may control the pre-regulator 218, the battery charging circuit 210, and/or the voltage regulators 230.

The battery charging circuit 210 may receive power from one or more ports (e.g., ports 205 and 207), and this received power may be converted and used to charge a battery or a battery pack in a battery circuit 215 of a portable device (e.g., a smartphone, tablet, and the like). For example, port 205 may be a Universal Serial Bus (USB) port for connecting to a wall adapter, whereas port 207 may be a wireless power port. The battery circuit 215 may include a single-cell or multi-cell-in-series battery (e.g., a two-cells-in-series, or 2S, battery). The battery circuit 215 may also include any protection circuitry, which may include switches implemented by transistors, for example. For certain aspects, the battery charging circuit 210, or at least a portion thereof, may reside in a PMIC in the device. The battery charging circuit 210 may comprise, for example, one or more switched-mode power supplies (e.g., a buck converter and/or a charge pump converter). For certain aspects, the battery charging circuit may comprise two or more parallel charging circuits, each capable of charging the battery, which may be connected together and to the battery in an effort to provide fast charging of the battery. The parallel charging circuits may be configured so that these circuits do not adversely interfere with each other during battery charging (e.g., in a master-slave relationship). Charging circuits for a parallel charger may use buck converter topologies.

The pre-regulator 218 may receive power from the battery with a voltage VBAT (e.g., 7 to 9 V). Used to regulate power for the voltage regulators 230, the pre-regulator 218 may comprise, for example, one or more switched-mode power supplies (e.g., a hybrid voltage divider and buck converter). As described below, the control logic 220 may receive an indication of a current associated with the pre-regulator 218 (e.g., output current Iout) and an indication of the output voltage VPH_PWR (e.g., 3.3 to 4 V) from the pre-regulator. Based, at least in part, on these indications, the control logic 220 may output one or more control signals 222 to control the pre-regulator 218. For example, in the case of a hybrid voltage divider and buck converter, the control logic 220 may output signals as inputs to the gate drivers for driving the power transistors to regulate the output voltage VPH_PWR. The one or more voltage regulators 230 may include one or more linear regulators and/or one or more switching regulators for generating smaller voltages (e.g., 1.2 to 3.3 V) from VPH_PWR. For certain aspects, the voltage regulators 230 may include core PMICs for the device.

Example Voltage Divider and Buck Converter Circuit

Certain aspects of the present disclosure provide a hybrid voltage divider (DIV) and buck converter circuit. A voltage divider circuit refers to a circuit that receives an input voltage (VIN) and provides an output voltage that is a ratio of VIN (e.g., a voltage-divided version of VIN).

Figure 3:
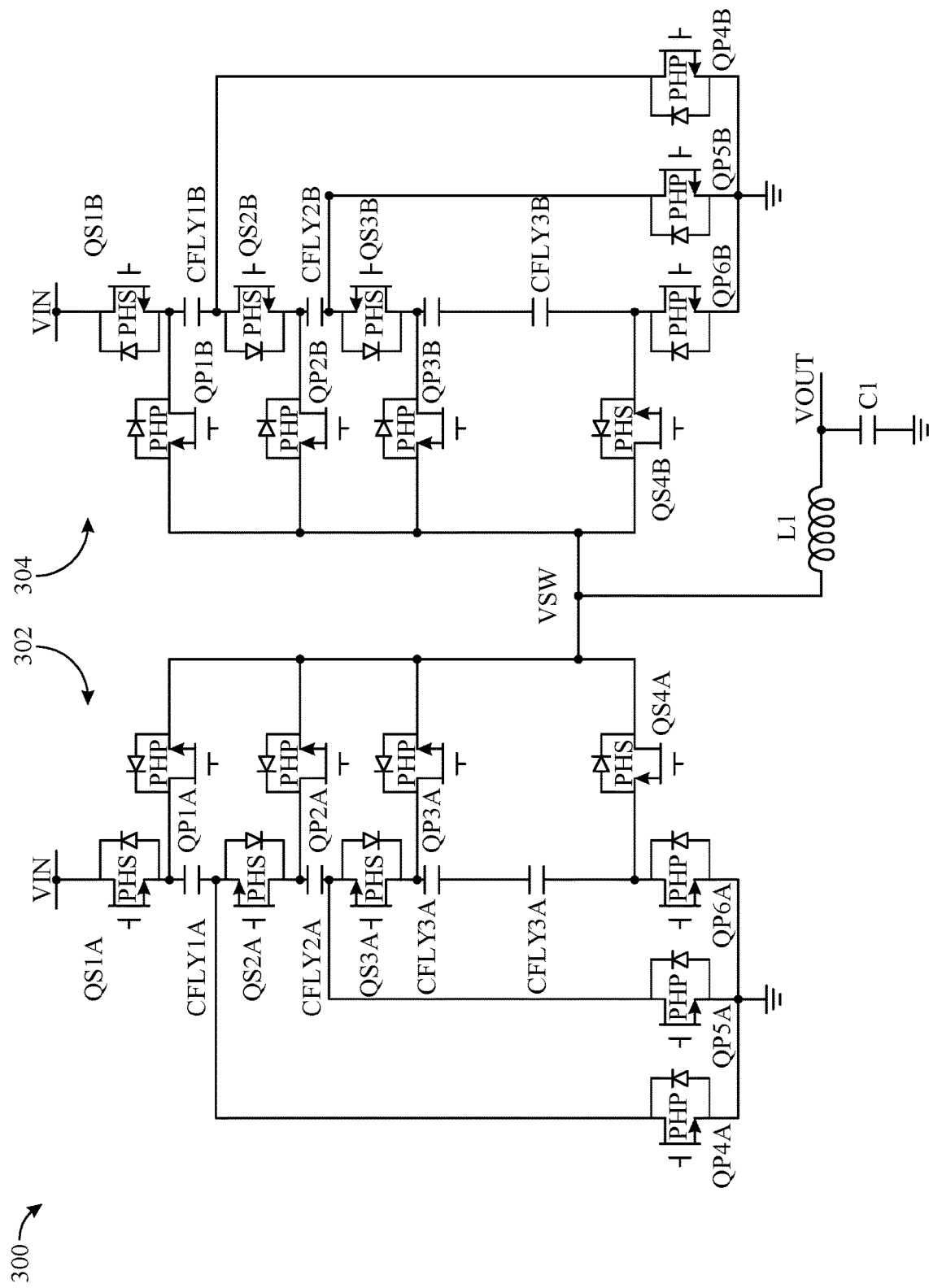
FIG. 3 illustrates a voltage divider and buck converter circuit, in accordance with certain aspects of the present disclosure.

FIG. 3 illustrates a voltage divider and buck converter circuit 300, in accordance with certain aspects of the present disclosure. The transistors described with respect to FIG. 3 may be implemented as field-effect transistors (FETs), in some aspects.

As shown, the circuit 300 includes a first voltage division branch 302 (also referred to herein as branch A) and a second voltage division branch 304 (also referred to herein as branch B). Each of the voltage division branches 302, 304 may be implemented as a charge pump circuit, as described in more detail herein. As shown, the first voltage division branch 302 includes transistors QS1A, QS2A, QS3A, and QS4A and the second voltage division branch 304 includes transistors QS1B, QS2B, QS3B, and QS4B. The transistors QS1A, QS2A, QS3A, and QS4A are used to implement a series phase (PHS) of the first voltage division branch 302 (e.g., a first charge pump), and the transistors QS1B, QS2B, QS3B, and QS4B are used to implement a series phase (PHS) of the second voltage division branch 304 (e.g., a second charge pump). Similarly, the first voltage division branch 302 includes transistors QP1A, QP2A, QP3A, QP4A, QP5A, and QP6A for a parallel phase (PHP) of the first voltage division branch 302, and the second voltage division branch 304 includes transistors QP1B, QP2B, QP3B, QP4B, QP5B, QP6B for a parallel phase (PHP) of the second voltage division branch 304. The transistors QS1A, QS2A, QS3A, QS4A, QS1B, QS2B, QS3B, and QS4B may be referred to herein as "PHS transistors," and transistors QP1A, QP2A, QP3A, QP4A, QP5A, QP6A, QP1B, QP2B, QP3B, QP4B, QP5B, and QP6B may be referred to herein as "PHP transistors."

As shown, a flying capacitive element CFLY1A is coupled between transistor QS1A and transistor QS2A, a flying capacitive element CFLY2A is coupled between transistor QS2A and QS3A, and a flying capacitive element CFLY3A is coupled between transistor QS3A and transistor QS4A. Similarly, a flying capacitive element CFLY1B is coupled between transistor QS1B and transistor QS2B, a flying capacitive element CFLY2B is coupled between transistor QS2B and transistor QS3B, and a flying capacitive element CFLY3B is coupled between transistor QS3B and transistor QS4B.

As shown, transistor QP1A is coupled between transistor QS1A and a switching voltage (VSW) node (also referred to herein as a "charge pump output node"). Transistor QP2A is coupled between transistor QS2A and the VSW node, and transistor QP3A is coupled between QS3A and the VSW node. As shown, an inductive element L1 is coupled between the VSW node and an output voltage (VOUT) node. A terminal of the inductive element L1 may be connected to the VSW node in some cases. In some aspects, a capacitive element C1 is coupled between the VOUT node and a reference potential node (e.g., electrical ground). Transistor QP4A is coupled between the flying capacitive element CFLY1A and the reference potential node (e.g., electrical ground), transistor QP5A is coupled between the flying capacitive element CFLY2A and the reference potential node, and transistor QP6A is coupled between the flying capacitive element CFLY3A and the reference potential node.

Transistor QP1B is coupled between transistor QS1B and the VSW node. Transistor QP2B is coupled between QS2B and the VSW node, and transistor QP3B is coupled between QS3B and the VSW node. Transistor QP4B is coupled between the flying capacitive element CFLY1B and the reference potential node (e.g., electrical ground), transistor QP5B is coupled between the flying capacitive element CFLY2B and the reference potential node, and transistor QP6B is coupled between the flying capacitive element CFLY3B and the reference potential node.

The voltage division branches 302, 304 may be controlled such that VSW is equal to VIN/4 during a powering state of the circuit 300 and zero volts during a freewheeling state. VIN/4 is generated by configuring each branch as a divide-by-4 (DIV4) charge pump, as described in more detail herein. VOUT may be generated based on a duty ratio (e.g., duty cycle) between the powering state (e.g., when VSW is VIN/4) and the freewheeling state. For example, VOUT may be equal to the product of VIN/4 and the duty ratio. The duty cycle may be controlled by a feedback loop from the VOUT node to control logic used to control transistors of the voltage divider and buck converter circuit.

In order for VSW to be equal to VIN/4, branch A and branch B may be operated in out-of-phase and in-phase states to balance the voltage across each of the flying capacitive elements to be VIN/4. Thus, a separate CFLY balancing circuit may not be used. During an out-of-phase state, flying capacitive elements of branch A may be configured in parallel and the flying capacitive elements of branch B may be configured in series, or vice versa. During an in-phase state, flying capacitive elements of both branch A and branch B may be configured in parallel or in series. The charge pump may be used to regulate VOUT using the freewheeling state and the inductive element L1. Thus, a separate buck converter circuit may not be used to regulate VOUT. The circuit 300 provides high power efficiency due to the reduced VSW (e.g., during the powering phase) created by using an efficient voltage divider (e.g., charge pump).

Figure 4:
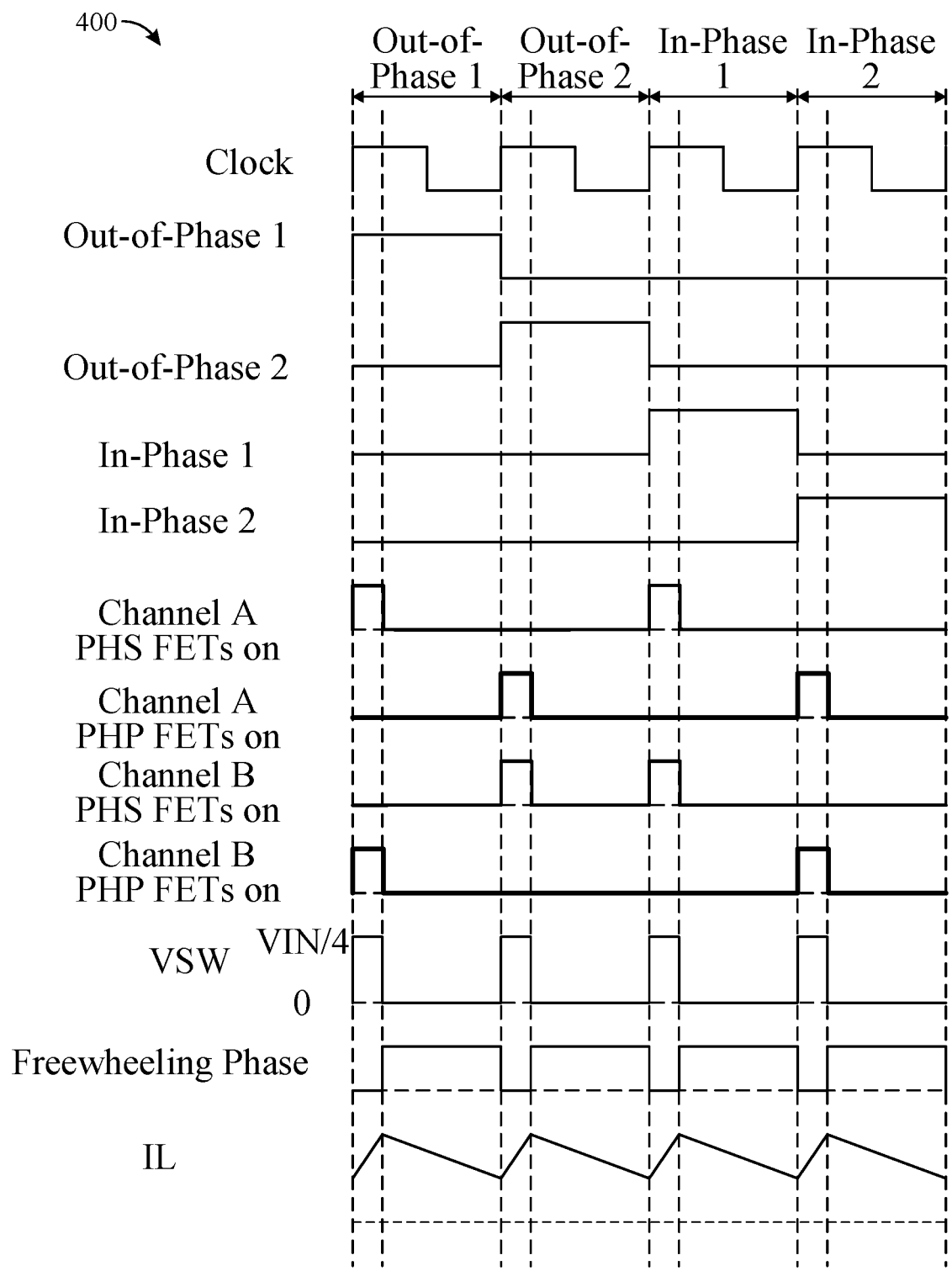
FIG. 4 is a timing diagram illustrating example signals of a voltage divider and buck converter circuit during the different states, in accordance with certain aspects of the present disclosure.

FIG. 4 is a timing diagram 400 illustrating example signals of the circuit 300 during different states, in accordance with certain aspects of the present disclosure. The different states include a first out-of-phase state, a second out-of-phase state, a first in-phase state, and a second in-phase state. Each of the different states includes a powering phase and a freewheeling phase, as described in more detail herein. The circuit 300 may be controlled based on a clock (e.g., 1 MHz clock), as shown. Timing diagram 400 also shows the current (IL) across inductive element L1 during each of the different states.

FIG. 5A illustrates an effective configuration 500 of the circuit 300 during a powering phase of a first out-of-phase state (labeled "out-of-phase 1" in timing diagram 400), and FIG. 5B illustrates current flow in the circuit 300 during the powering phase of the first out-of-phase state, in accordance with certain aspects of the present disclosure. The first out-of-phase state includes a powering phase and freewheeling phase.

As shown in FIG. 5B, during the powering phase of the first out-of-phase state, the PHS transistors of branch A may be turned on, the PHP transistors of branch A may be turned off, the PHP transistors of branch B may be turned on, and the PHS transistors of branch B may be turned off. Thus, as shown in FIG. 5A, the flying capacitive elements of branch A (CFLY1A, CFLY2A, CFLY3A) may be configured in series between the VIN node and the VSW node and the flying capacitive elements of branch B (CFLY1B, CFLY2B, CFLY3B) may be configured in parallel. As shown in FIG. 5B, current 502 flows from the VIN node, across the PHS transistors of branch A, and to the inductive element L1. Current 504 flows from the reference potential node, across transistor QP4B, across transistor QP1B, and to the inductive element L1. Current 506 flows from the reference potential node, across transistor QP5B, across transistor QP2B, and to the inductive element L1. Current 508 flows from the reference potential node, across transistor QP6B, across transistor QP3B, and to the inductive element L1. During the powering phase, VSW may be equal to VIN/4. As shown in FIG. 4, the inductor current (IL) (e.g., current across inductive element L1) increases during the powering phase (e.g., inductive element L1 charges).

FIG. 6A illustrates an effective configuration 600 of the circuit 300 during a freewheeling phase of the first out-of-phase state, and FIG. 6B illustrates current flow in the circuit 300 during the freewheeling phase of the first out-of-phase state, in accordance with certain aspects of the present disclosure.

As shown in FIG. 6B, during the freewheeling phase of the first out-of-phase state, transistors QP6A, QS4A, QS4B, and QP6B are turned on. Thus, as shown in FIG. 6A, the VSW node may be coupled to the reference potential node. Current 602 flows from the reference potential node, across transistors QP6A and QS4A, to the inductive element L1, and current 604 flows from the reference potential node, across transistors QP6B and QS4B, to the inductive element L1. During the freewheeling phase, VSW may be equal to zero volts. As shown in FIG. 4, the inductor current IL decreases during the freewheeling phase (e.g., inductive element L1 discharges).

FIG. 7A illustrates an effective configuration 700 of the circuit 300 during a powering phase of a second out-of-phase state (labeled "out-of-phase 2" in timing diagram 400), and FIG. 7B illustrates current flow in the circuit 300 during the powering phase of the second out-of-phase state, in accordance with certain aspects of the present disclosure.

As shown in FIG. 7B, during the powering phase of the second out-of-phase state, the PHS transistors of branch B may be turned on, the PHP transistors of branch B may be turned off, the PHP transistors of branch A may be turned on, and the PHS transistors of branch A may be turned off. Thus, as shown in FIG. 7A, the flying capacitive elements of branch B (CFLY1B, CFLY2B, CFLY3B) may be in configured in series between the VIN node and the VSW node and the flying capacitive elements of branch A (CFLY1A, CFLY2A, CFLY3A) may be configured in parallel. As shown in FIG. 7B, current 702 flows from the VIN node, across the PHS transistors of branch B, and to the inductive element L1. Current 704 flows from the reference potential node, across transistor QP4A, across transistor QP1A, and to the inductive element L1. Current 706 flows from the reference potential node, across transistor QP5A, across transistor QP2A, and to the inductive element L1. Current 708 flows from the reference potential node, across transistor QP6A, across transistor QP3A, and to the inductive element L1. During the powering phase, VSW may be equal to VIN/4. As shown in FIG. 4, the inductor current (IL) (e.g., current across inductive element L1) increases during the powering phase (e.g., inductive element L1 charges) of the second out-of-phase state.

After the powering phase of the second out-of-phase state, a freewheeling phase of the second out-of-phase state begins. During the freewheeling phase, the VSW node is coupled to the reference potential node by turning on transistors QP6A, QS4A, QS4B, and QP6B, as described herein.

Figure 8A:
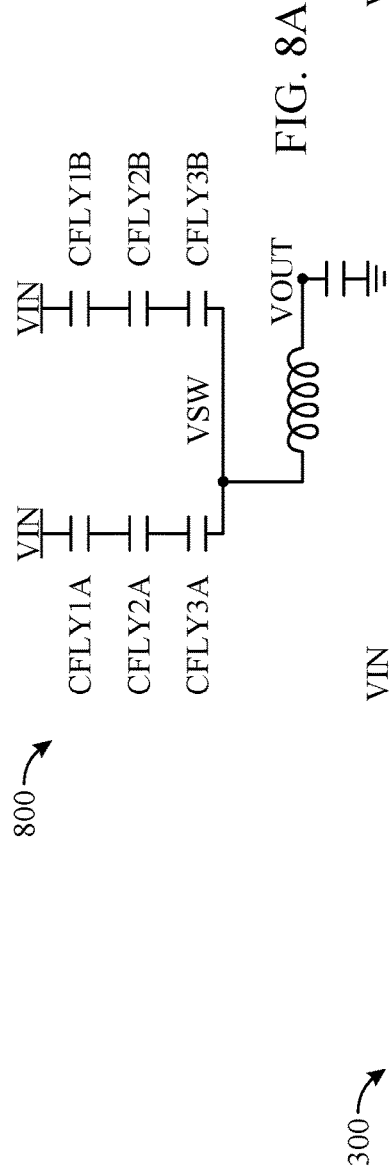
FIG. 8A illustrates an effective configuration of a voltage divider and buck converter circuit during a powering phase of a first in-phase state, in accordance with certain aspects of the present disclosure.
Figure 8B:
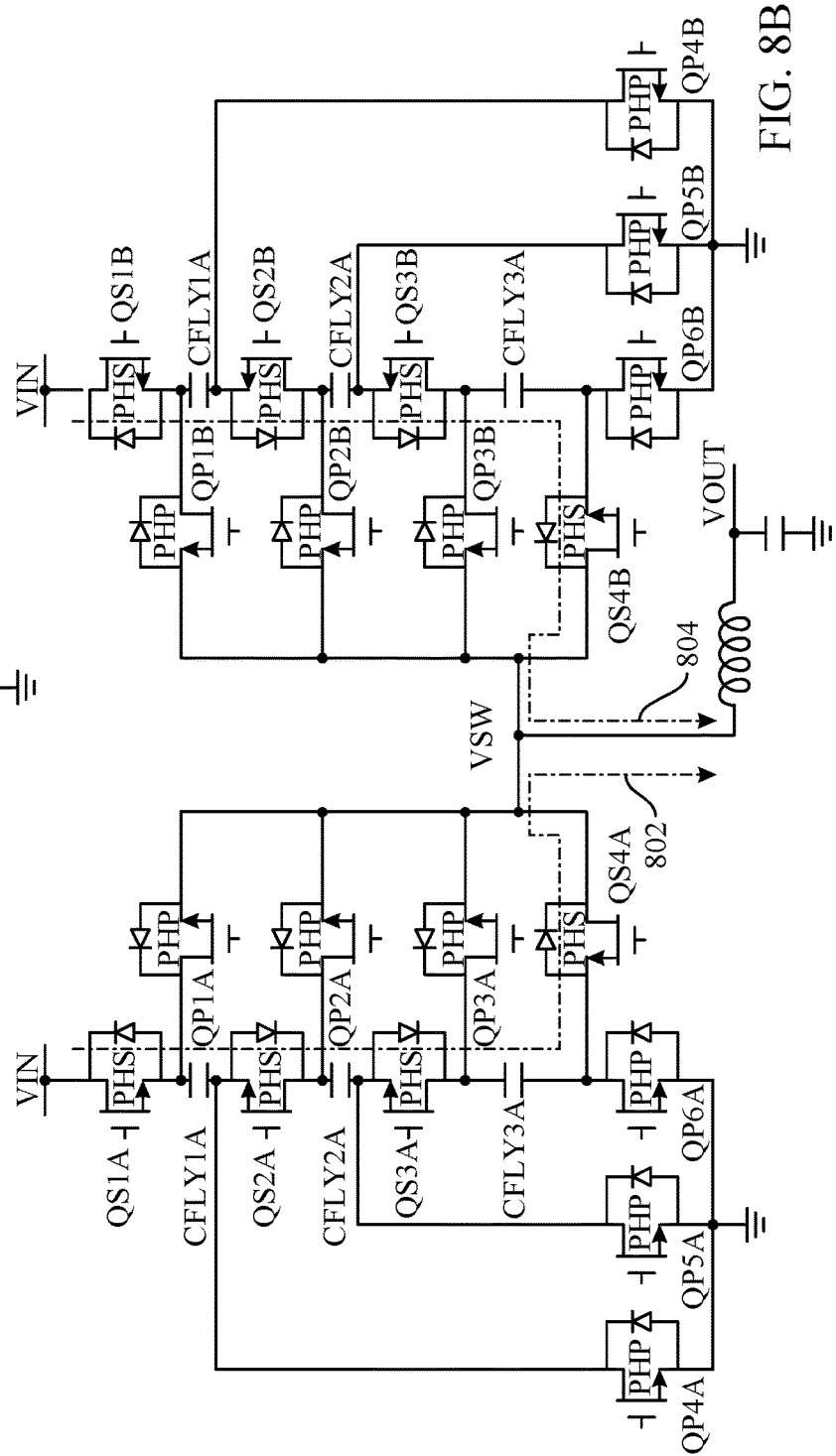
FIG. 8B illustrates current flow in a voltage divider and buck converter circuit during a powering phase of a first in-phase state, in accordance with certain aspects of the present disclosure.

FIG. 8A illustrates an effective configuration 800 of the circuit 300 during a powering phase of a first in-phase state (labeled "in-phase 1" in timing diagram 400), and FIG. 8B illustrates current flow in the circuit 300 during the powering phase of the first in-phase state, in accordance with certain aspects of the present disclosure.

As shown in FIG. 8B, during the powering phase of the first in-phase state, the PHS transistors of branch A and branch B may be turned on, and the PHP transistors of branch A and branch B may be turned off. Thus, as shown in FIG. 8A, the flying capacitive elements of branch A (CFLY1A, CFLY2A, CFLY3A) may be configured in series between the VIN node and the VSW node and the flying capacitive elements of branch B (CFLY1B, CFLY2B, CFLY3B) may be in configured in series between the VIN node and the VSW node. As shown in FIG. 8B, current 802 flows from the VIN node, across the PHS transistors of branch A, and to the inductive element L1, and current 804 flows from the VIN node, across the PHS transistors of branch B, and to the inductive element L1. As shown in FIG. 4, the inductor current (IL) (e.g., current across inductive element L1) increases during the powering phase (e.g., inductive element L1 charges) of the second out-of-phase state.

After the powering phase of the first in-phase state, a freewheeling phase of the first in-phase state begins. During the freewheeling phase, the VSW node is coupled to the reference potential node by turning on transistors QP6A, QS4A, QS4B, and QP6B, as described herein.

FIG. 9A illustrates an effective configuration 900 of the circuit 300 during a powering phase of a second in-phase state (labeled "in-phase 2" in timing diagram 400), and FIG. 9B illustrates current flow in the circuit 300 during the powering phase of the second in-phase state, in accordance with certain aspects of the present disclosure.

As shown in FIG. 9B, during the powering phase of the first in-phase state, the PHP transistors of branch A and branch B may be turned on, and the PHS transistors of branch A and branch B may be turned off. Thus, as shown in FIG. 8A, the flying capacitive elements of branch A (CFLY1A, CFLY2A, CFLY3A) may be configured in parallel and the flying capacitive elements of branch B (CFLY1B, CFLY2B, CFLY3B) may be configured in parallel. As shown in FIG. 9B, current 902 flows from the reference potential node, across transistor QP4A, across transistor QP1A, and to the inductive element L1. Current 904 flows from the reference potential node, across transistor QP5A, across transistor QP2A, and to the inductive element L1. Current 906 flows from the reference potential node, across transistor QP6A, across transistor QP3A, and to the inductive element L1. Current 908 flows from the reference potential node, across transistor QP4B, across transistor QP1B, and to the inductive element L1. Current 910 flows from the reference potential node, across transistor QP5B, across transistor QP2B, and to the inductive element L1. Current 912 flows from the reference potential node, across transistor QP6B, across transistor QP3B, and to the inductive element L1. As shown in FIG. 4, the inductor current (IL) (e.g., current across inductive element L1) increases during the powering phase (e.g., inductive element L1 charges) of the second in-phase state.

After the powering phase of the second in-phase state, a freewheeling phase of the second in-phase state begins. During the freewheeling phase, the VSW node is coupled to the reference potential node by turning on transistors QP6A, QS4A, QS4B, and QP6B, as described herein.

While the voltage divider and buck converter circuit of the present disclosure is described with an implementation having a divide ratio of 4 (e.g., DIV4) to facilitate understanding, the aspects of the present disclosure may be used for any divide ratio. For example, the voltage divider and buck converter circuit may be implemented with a divide ratio of 3 or 5.

Figure 10:
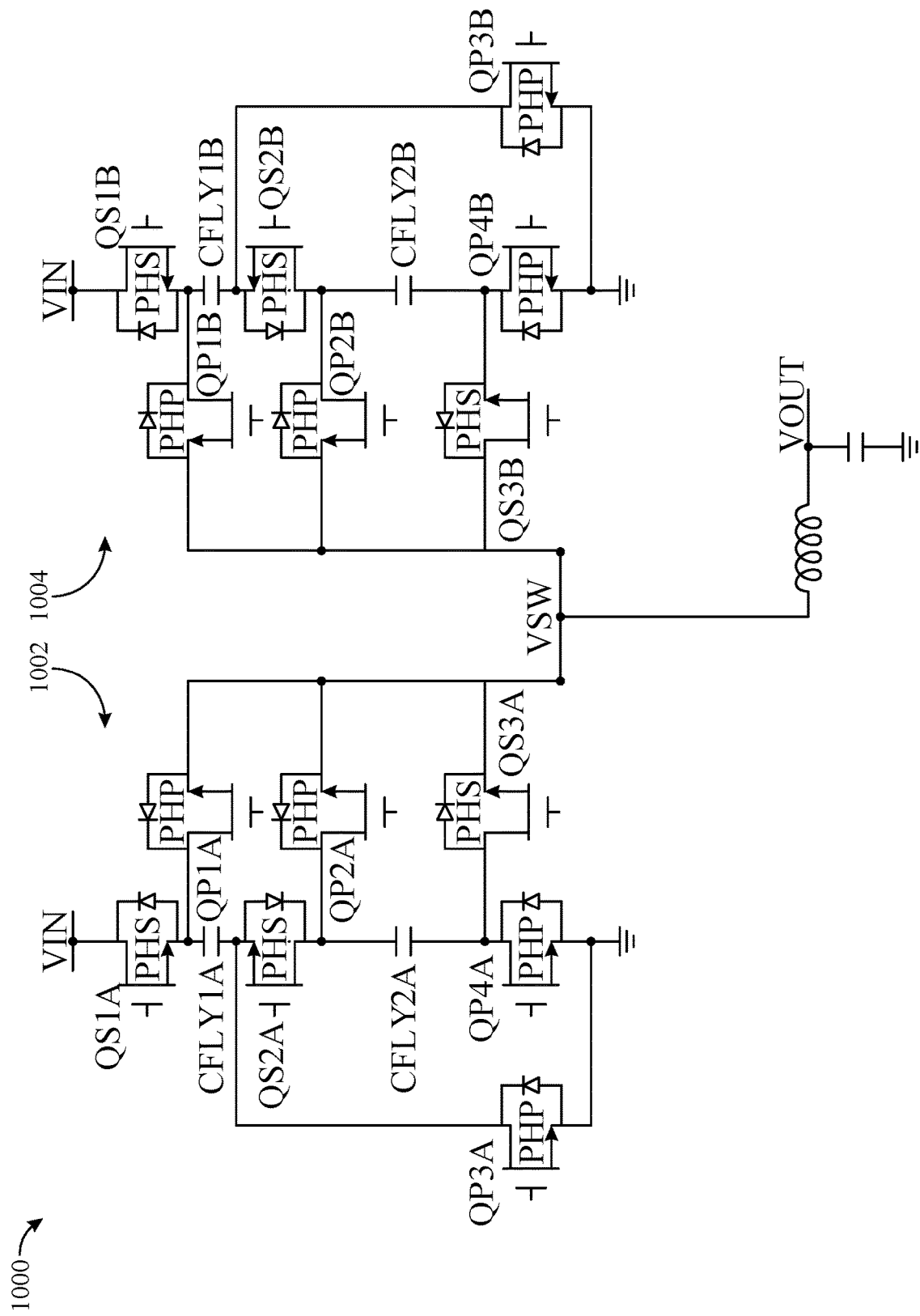
FIG. 10 illustrates a voltage divider and buck converter circuit with a divide ratio of three, in accordance with certain aspects of the present disclosure.

FIG. 10 illustrates a voltage divider and buck converter circuit 1000 with a divide ratio of 3, in accordance with certain aspects of the present disclosure. For example, VSW may be equal to VIN/3 during the powering phases of the circuit 1000.

As shown, the circuit 1000 includes a first voltage division branch 1002 (also referred to herein as branch A) and a second voltage division branch 1004 (also referred to herein as branch B). As shown, the first voltage division branch 302 includes transistors QS1A, QS2A, QS3A, and the second voltage division branch 304 includes transistors QS1B, QS2B, QS3B. The transistors QS1A, QS2A, QS3A, and QS4A are used to implement a PHS of the first voltage division branch 1002 (e.g., a first charge pump), and the transistors QS1B, QS2B, QS3B are used to implement a PHS of the second voltage division branch 1004 (e.g., a second charge pump). Similarly, the first voltage division branch 1002 includes transistors QP1A, QP2A, QP3A, QP4A for a PHP of the first voltage division branch 1002, and the second voltage division branch 1004 includes transistors QP1B, QP2B, QP3B, QP4B for a PHP of the second voltage division branch 1004.

As shown, a flying capacitive element CFLY1A is coupled between transistor QS1A and transistor QS2A, and a flying capacitive element CFLY2A is coupled between transistor QS2A and QS3A. Similarly, a flying capacitive element CFLY1B is coupled between transistor QS1B and transistor QS2B, and a flying capacitive element CFLY2B is coupled between transistor QS2B and transistor QS3B.

As shown, transistor QP1A is coupled between transistor QS1A and a VSW node and transistor QP2A is coupled between QS2A and the VSW node. Transistor QP3A is coupled between the flying capacitive element CFLY1A and the reference potential node (e.g., electrical ground), and transistor QP4A is coupled between the flying capacitive element CFLY2A and the reference potential node.

Transistor QP1B is coupled between transistor QS1B and the VSW node and transistor QP2B is coupled between QS2B and the VSW node. Transistor QP3B is coupled between the flying capacitive element CFLY1B and the reference potential node (e.g., electrical ground), and transistor QP4B is coupled between the flying capacitive element CFLY2B and the reference potential node. The circuit 1000 may be operated in a similar fashion as described with respect to circuit 300. For example, the circuit 300 may be operated with first and second out-of-phase states, where during powering phases, flying capacitive elements of branch A may be configured in parallel and the flying capacitive elements of branch B may be configured in series, or vice versa. The circuit 1000 may also include first and second in-phase states, where during powering phases, the flying capacitive elements of branch A and branch B may be configured in parallel or in series.

Figure 11:
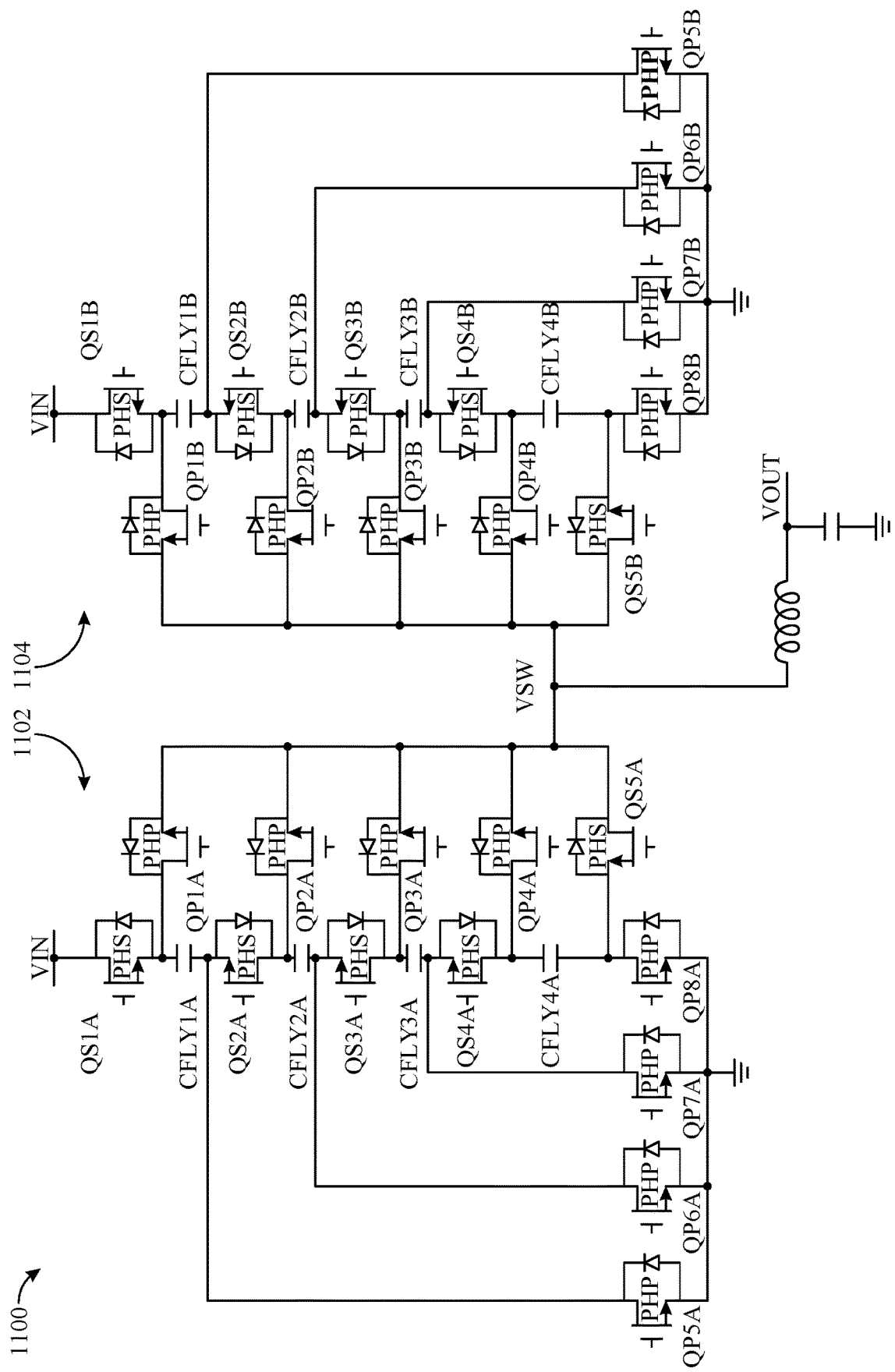
FIG. 11 illustrates a voltage divider and buck converter circuit with a divide ratio of five, in accordance with certain aspects of the present disclosure.

FIG. 11 illustrates a voltage divider and buck converter circuit 1000 with a divide ratio of 5, in accordance with certain aspects of the present disclosure. For example, VSW may be equal to VIN/5 during the powering phases of the circuit 1100.

As shown, the circuit 1100 includes a first voltage division branch 1102 (also referred to herein as branch A) and a second voltage division branch 1104 (also referred to herein as branch B). As shown, the first voltage division branch 1102 includes transistors QS1A, QS2A, QS3A, QS4A, and QS5A, and the second voltage division branch 304 includes transistors QS1B, QS2B, QS3B, QS4B, and QS5B. The transistors QS1A, QS2A, QS3A, QS4A, and QS5A are used to implement a PHS of the first voltage division branch 1102, and the transistors QS1B, QS2B, QS3B, QS4B, and QS5B are used to implement a PHS of the second voltage division branch 1104. Similarly, the first voltage division branch 1002 includes transistors QP1A, QP2A, QP3A, QP4A, QP5A, QP6A, QP7A, and QP8A for a PHP of the first voltage division branch 1102, and the second voltage division branch 1104 includes transistors QP1B, QP2B, QP3B, QP4B, QP5B, QP6B, QP7B, and QP8B for a PHP of the second voltage division branch 1104.

As shown, a flying capacitive element CFLY1A is coupled between transistor QS1A and transistor QS2A, a flying capacitive element CFLY2A is coupled between transistor QS2A and QS3A, a flying capacitive element CFLY3A is coupled between transistor QS3A and QS4A, and a flying capacitive element CFLY4A is coupled between transistor QS4A and QS5A. Similarly, a flying capacitive element CFLY1B is coupled between transistor QS1B and transistor QS2B, a flying capacitive element CFLY2B is coupled between transistor QS2B and QS3B, a flying capacitive element CFLY3B is coupled between transistor QS3B and QS4B, and a flying capacitive element CFLY4B is coupled between transistor QS4B and QS5B.

As shown, transistor QP1A is coupled between transistor QS1A and a VSW node, transistor QP2A is coupled between QS2A and the VSW node, transistor QP3A is coupled between QS3A and the VSW node, transistor QP4A is coupled between QS4A and the VSW node. Transistors QP5A, QP6A, QP7A, and QP8A are coupled between the reference potential node (e.g., electrical ground) and respective flying capacitive elements CFLY1A, CFLY2A, CFLY3A, CFLY4A. Similarly, transistors QP5B, QP6B, QP7B, and QP8B are coupled between the reference potential node (e.g., electrical ground) and respective flying capacitive elements CFLY1B, CFLY2B, CFLY3B, CFLY4B.

Figure 12A:
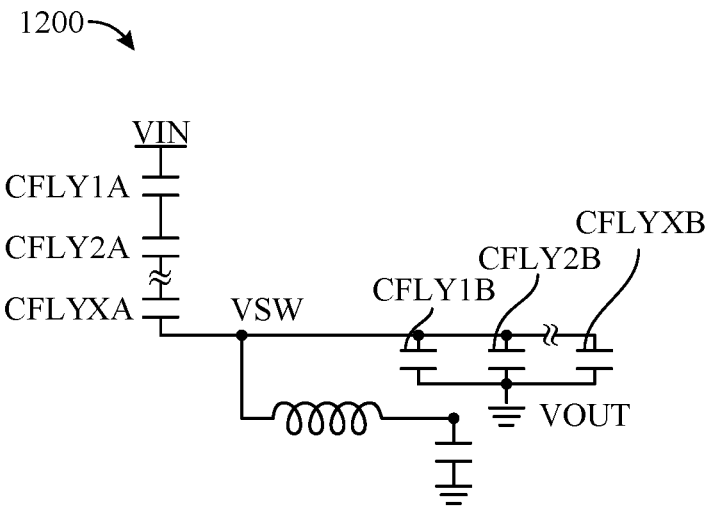
FIGS. 12A, 12B, 12C, and 12D illustrate effective configurations of a voltage divider and buck converter circuit during in-phase and out-of-phase states, in accordance with certain aspects of the present disclosure.
Figure 12B:
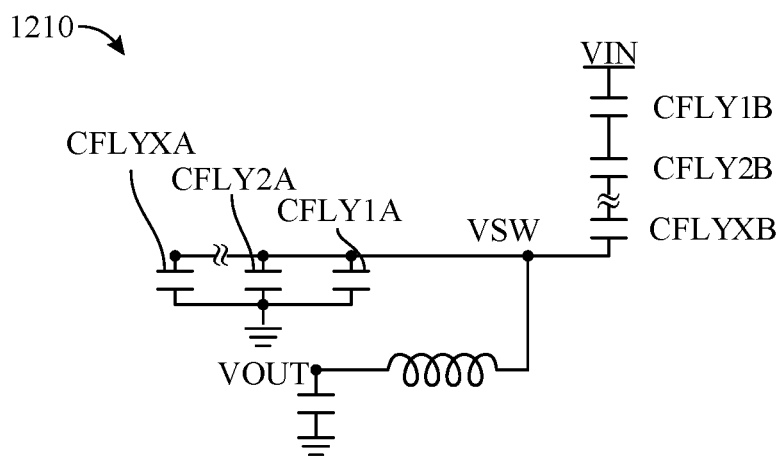
Figure 12C:
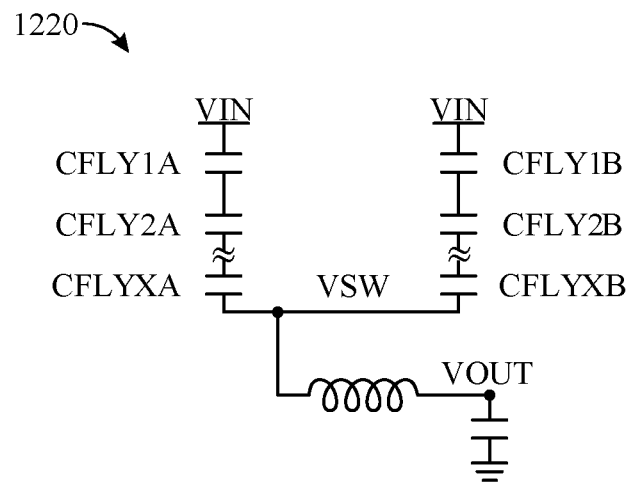
Figure 12D:
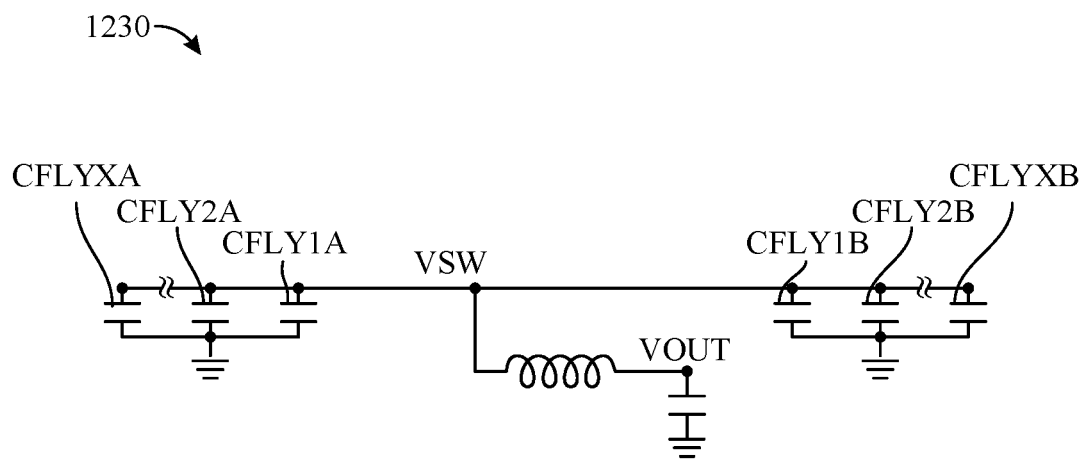

FIG. 12A illustrates an effective configuration 1200 of a voltage divider and buck converter circuit during a powering phase of a first out-of-phase state. FIG. 12B illustrates an effective configuration 1210 of a voltage divider and buck converter circuit during a powering phase of a second out-of-phase state. FIG. 12C illustrates an effective configuration 1220 of a voltage divider and buck converter circuit during a powering phase of a first in-phase state. FIG. 12D illustrates an effective configuration 1230 of a voltage divider and buck converter circuit during a powering phase of a second in-phase state. As shown, the voltage divider and buck converter circuit may be implemented with any suitable divide ratio. For example, during the powering phase of a first out-of-phase state shown in FIG. 12A, CFLY1A, CFLY2A, to CLFLYXA, X being any integer greater than 2, may be coupled in series. Similarly, CFLY1B, CFLY2B, to CLFLYXB are coupled in parallel. During the powering phase of a second out-of-phase state shown in FIG. 12B, CFLY1A, CFLY2A, to CLFLYXA may be coupled in parallel and CFLY1B, CFLY2B, to CLFLYXB may be coupled in series.

During the powering phase of the first in-phase state shown in FIG. 12C, CFLY1A, CFLY2A, to CLFLYXA may be coupled in series and CFLY1B, CFLY2B, to CLFLYXB may be coupled in series. During the powering phase of the second in-phase state shown in FIG. 12D, CFLY1A, CFLY2A, to CLFLYXA may be coupled in parallel and CFLY1B, CFLY2B, to CLFLYXB may be coupled in parallel.

Figure 13:
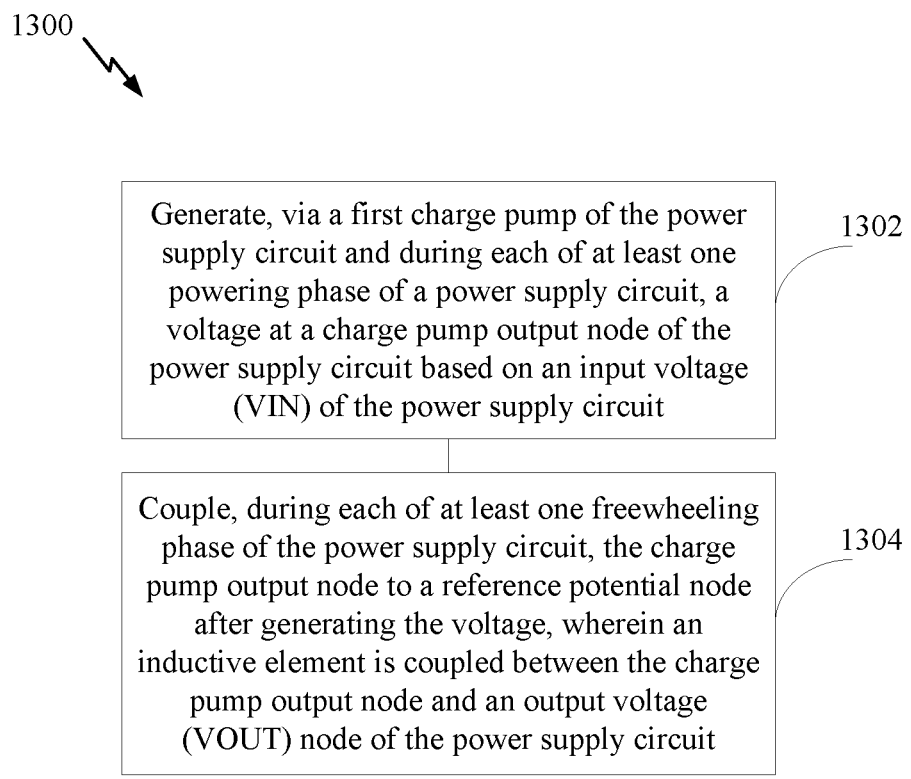
FIG. 13 is a flow diagram illustrating example operations for supplying power, in accordance with certain aspects of the present disclosure.

FIG. 13 is a flow diagram illustrating example operations 1300 for supplying power. The operations 1300 may be performed by a power supply device including a power supply circuit (e.g., the power supply circuit of FIG. 3) and control logic (e.g., control logic 220) configured to control operations of the power supply circuit.

At block 1302, the power supply device generates, via a first charge pump (e.g., voltage division branch 302, 1002, or 1102) of the power supply circuit and during each of at least one powering phase of the power supply circuit, a voltage at a charge pump output node (e.g., the VSW node of FIG. 3) of the power supply circuit based on a VIN of the power supply circuit. In some aspects, the voltage may be further generated via a second charge pump (e.g., voltage division branch 304, 1004, or 1104) of the power supply circuit. Generating the voltage at the charge pump output node may include, during a first out-of-phase state (e.g., out-of-phase state 1 shown in FIG. 4) of the power supply circuit, configuring flying capacitive elements (e.g., CFLY1A and CFLY2A) of the first charge pump in a series configuration and flying capacitive elements (e.g., CFLY1B and CFLY2B) of the second charge pump in a parallel configuration. Generating the voltage at the charge pump output node may include, during a second out-of-phase state of the power supply circuit, configuring the flying capacitive elements of the first charge pump in a parallel configuration and the flying capacitive elements of the second charge pump in a series configuration.

In some aspects, generating the voltage at the charge pump output node may include, during a first in-phase state of the power supply circuit, configuring flying capacitive elements (e.g., CFLY1A, CFLY2A, CFLY1B, and CFLY2B) of the first charge pump in a series configuration and flying capacitive elements of the second charge pump in a series configuration, and during a second in-phase state of the power supply circuit, configuring the flying capacitive elements of the first charge pump in a parallel configuration and the flying capacitive elements of the second charge pump in a parallel configuration.

At block 1304, the power supply device couples, during each of at least one freewheeling phase of the power supply circuit, the charge pump output node to a reference potential node (e.g., electrical ground) after generating the voltage. In some aspects, an inductive element (e.g., inductive L1 shown in FIG. 3) may be coupled between the charge pump output node and a VOUT node of the power supply circuit.

In certain aspects, the first charge pump includes: a first series phase transistor (QS1A shown in FIG. 3); a first flying capacitive element (e.g., CFLY1A shown in FIGS. 3, 10, and 11), the first series phase transistor being coupled between the first flying capacitive element and a VIN node; a second series phase transistor (e.g., QS2A shown in FIGS. 3, 10, and 11); a second flying capacitive element (e.g., CFLY2A shown in FIGS. 3, 10, and 11), the second series phase transistor being coupled between the second flying capacitive element and the first flying capacitive element; and a third series phase transistor (e.g., QS3A shown in FIGS. 3, 10, and 11) coupled between the second flying capacitive element and the charge pump output node. In some aspects, the first charge pump further includes: a first parallel phase transistor (e.g., QP1A shown in FIGS. 3, 10, and 11) coupled between the first series phase transistor and the charge pump output node; a second parallel phase transistor (e.g., QP2A shown in FIGS. 3, 10, and 11) coupled between the second series phase transistor and the charge pump output node; a third parallel phase transistor (e.g., QP4A shown in FIG. 3, QP3A shown in FIG. 10, or QP5A shown in FIG. 11) coupled between the first flying capacitive element and a reference potential node of the power supply circuit; and a fourth parallel phase transistor (e.g., QP5A shown in FIG. 3, QP4A shown in FIG. 10, or QP6A shown in FIG. 11) coupled between the second flying capacitive element and the reference potential node of the power supply circuit.

In some aspects, the first charge pump may also include: a fourth series phase transistor (e.g., QS4A shown in FIG. 3); and a third flying capacitive element (e.g., CFLY3A shown in FIG. 3). The third series phase transistor may be coupled between the second flying capacitive element and the third flying capacitive element, and the fourth series phase transistor may be coupled between the third flying capacitive element and the charge pump output node.

In some aspects, the first charge pump may also include: a first parallel phase transistor (e.g., QP1A shown in FIG. 3) coupled between the first series phase transistor and the charge pump output node; a second parallel phase transistor (e.g., QP2A shown in FIG. 3) coupled between the second series phase transistor and the charge pump output node; a third parallel phase transistor (e.g., QP3A shown in FIG. 3) coupled between the third series phase transistor and the charge pump output node; a fourth parallel phase transistor (e.g., QP4A shown in FIG. 3) coupled between the first flying capacitive element and a reference potential node of the power supply circuit; a fifth parallel phase transistor (e.g., QP5A shown in FIG. 3) coupled between the second flying capacitive element and the reference potential node of the power supply circuit; and a sixth parallel phase transistor (e.g., QP6A shown in FIG. 3) coupled between the third flying capacitive element and the reference potential node of the power supply circuit.

In some aspects, generating the voltage includes: turning on the first series phase transistor, the second series phase transistor, and the third series phase transistor during a first powering phase (e.g., powering phase of out-of-phase state 1 shown in FIG. 4) of the at least one powering phase; and turning on the third series phase transistor and the fourth parallel phase transistor during a first freewheeling phase (e.g., freewheeling phase of out-of-phase state 1 shown in FIG. 4) of the at least one freewheeling phase, the first freewheeling phase being after the first powering phase. In some aspects, generating the voltage may include: turning on the first parallel phase transistor, the second parallel phase transistor, the third parallel phase transistor, and the fourth parallel phase transistor during a second powering phase (e.g., powering phase of out-of-phase state 2 shown in FIG. 4) of the at least one powering phase; and turning on the third series phase transistor and the fourth parallel phase transistor during a second freewheeling phase (e.g., freewheeling phase of out-of-phase state 2 shown in FIG. 4) of the at least one freewheeling phase, the second freewheeling phase being after the second powering phase.

Example Aspects

Aspect 1: A power supply circuit, comprising: a first charge pump coupled between an input voltage (VIN) node of the power supply circuit and a charge pump output node of the power supply circuit; an inductive element having a first terminal coupled to the charge pump output node and a second terminal coupled to an output voltage (VOUT) node of the power supply circuit; and an output capacitive element coupled to the VOUT node of the power supply circuit.

Aspect 2: The power supply circuit of Aspect 1, further comprising a second charge pump coupled between the VIN node and the charge pump output node, wherein the charge pump output node is further coupled to an output of the first charge pump and to an output of the second charge pump.

Aspect 3: The power supply circuit of Aspect 2, wherein: during a first out-of-phase state of the power supply circuit, flying capacitive elements of the first charge pump are configured in a series configuration and flying capacitive elements of the second charge pump are configured in a parallel configuration; and during a second out-of-phase state of the power supply circuit, the flying capacitive elements of the first charge pump are configured in a parallel configuration and the flying capacitive elements of the second charge pump are configured in a series configuration.

Aspect 4: The power supply circuit of Aspect 2 or 3, wherein: during a first in-phase state of the power supply circuit, flying capacitive elements of the first charge pump are configured in a series configuration and flying capacitive elements of the second charge pump are configured in a series configuration; and during a second in-phase state of the power supply circuit, the flying capacitive elements of the first charge pump are configured in a parallel configuration and the flying capacitive elements of the second charge pump are configured in a parallel configuration.

Aspect 5: The power supply circuit according to any of Aspects 1-4, wherein the first charge pump includes: a first series phase transistor; a first flying capacitive element, the first series phase transistor being coupled between the first flying capacitive element and the VIN node; a second series phase transistor; a second flying capacitive element, the second series phase transistor being coupled between the second flying capacitive element and the first flying capacitive element; and a third series phase transistor coupled between the second flying capacitive element and the charge pump output node.

Aspect 6: The power supply circuit of Aspect 5, wherein the first charge pump further includes: a first parallel phase transistor coupled between the first series phase transistor and the charge pump output node; a second parallel phase transistor coupled between the second series phase transistor and the charge pump output node; a third parallel phase transistor coupled between the first flying capacitive element and a reference potential node of the power supply circuit; and a fourth parallel phase transistor coupled between the second flying capacitive element and the reference potential node of the power supply circuit.

Aspect 7: The power supply circuit of Aspect 5 or 6, wherein the first charge pump further includes: a fourth series phase transistor; and a third flying capacitive element, wherein the third series phase transistor is coupled between the second flying capacitive element and the third flying capacitive element, and wherein the fourth series phase transistor is coupled between the third flying capacitive element and the charge pump output node.

Aspect 8: The power supply circuit of Aspect 7, wherein the first charge pump further includes: a first parallel phase transistor coupled between the first series phase transistor and the charge pump output node; a second parallel phase transistor coupled between the second series phase transistor and the charge pump output node; a third parallel phase transistor coupled between the third series phase transistor and the charge pump output node; a fourth parallel phase transistor coupled between the first flying capacitive element and a reference potential node of the power supply circuit; a fifth parallel phase transistor coupled between the second flying capacitive element and the reference potential node of the power supply circuit; and a sixth parallel phase transistor coupled between the third flying capacitive element and the reference potential node of the power supply circuit.

Aspect 9: The power supply circuit according to any of Aspects 1-8, wherein: during a powering phase of the power supply circuit, flying capacitive elements of the first charge pump are configured in a series or parallel configuration; and during a freewheeling phase of the power supply circuit, the charge pump output node is coupled to a reference potential node via one or more transistors of the first charge pump.

Aspect 10: A power supply circuit, comprising: a first series phase transistor coupled between an input voltage (VIN) node of the power supply circuit and a first flying capacitive element; a second series phase transistor coupled between the first flying capacitive element and a second flying capacitive element; a third series phase transistor coupled between the second flying capacitive element and a charge pump output node; a first parallel phase transistor coupled between the first series phase transistor and the charge pump output node; a second parallel phase transistor coupled between the second series phase transistor and the charge pump output node; a third parallel phase transistor coupled between the first flying capacitive element and a reference potential node of the power supply circuit; a fourth parallel phase transistor coupled between the second flying capacitive element and the reference potential node of the power supply circuit; and an inductive element coupled between the charge pump output node and an output voltage (VOUT) node of the power supply circuit.

Aspect 11: The power supply circuit of Aspect 10, further comprising an output capacitive element coupled to the VOUT node of the power supply circuit.

Aspect 12: The power supply circuit of Aspect 10 or 11, further comprising a fourth series phase transistor coupled between the VIN node of the power supply circuit and a third flying capacitive element; a fifth series phase transistor coupled between the third flying capacitive element and a fourth flying capacitive element; a sixth series phase transistor coupled between the fourth flying capacitive element and the charge pump output node; a fifth parallel phase transistor coupled between the fourth series phase transistor and the charge pump output node; a sixth parallel phase transistor coupled between the fifth series phase transistor and the charge pump output node; a seventh parallel phase transistor coupled between the third flying capacitive element and the reference potential node of the power supply circuit; and an eighth parallel phase transistor coupled between the fourth flying capacitive element and the reference potential node of the power supply circuit.

Aspect 13: The power supply circuit of Aspect 12, wherein: during a first out-of-phase state of the power supply circuit, the first series phase transistor, the second series phase transistor, the third series phase transistor, the fifth parallel phase transistor, the sixth parallel phase transistor, the seventh parallel phase transistor, and the eighth parallel phase transistor are turned on; and during a second out-of-phase state of the power supply circuit, the fourth series phase transistor, the fifth series phase transistor, the sixth series phase transistor, the first parallel phase transistor, the second parallel phase transistor, the third parallel phase transistor, and the fourth parallel phase transistor are turned on.

Aspect 14: The power supply circuit of Aspect 12 or 13, wherein: during a first in-phase state of the power supply circuit, the first series phase transistor, the second series phase transistor, the third series phase transistor, the fourth series phase transistor, the fifth series phase transistor, and the sixth series phase transistor are turned on; and during a second in-phase state of the power supply circuit, the first parallel phase transistor, the second parallel phase transistor, the third parallel phase transistor, the fourth parallel phase transistor, the fifth parallel phase transistor, the sixth parallel phase transistor, the seventh parallel phase transistor, and the eighth parallel phase transistor are turned on.

Aspect 15: The power supply circuit according to any of Aspects 10-14, wherein during a freewheeling phase of the power supply circuit, the third series phase transistor and the fourth parallel phase transistor are turned on.

Aspect 16: A method for operating a power supply circuit, comprising: generating, via a first charge pump of the power supply circuit and during each of at least one powering phase of the power supply circuit, a voltage at a charge pump output node of the power supply circuit based on an input voltage (VIN) of the power supply circuit; and coupling, during each of at least one freewheeling phase of the power supply circuit, the charge pump output node to a reference potential node after generating the voltage, wherein an inductive element is coupled between the charge pump output node and an output voltage (VOUT) node of the power supply circuit.

Aspect 17: The method of Aspect 16, wherein the voltage is further generated via a second charge pump of the power supply circuit.

Aspect 18: The method of Aspect 17, wherein generating the voltage at the charge pump output node includes: during a first out-of-phase state of the power supply circuit, configuring flying capacitive elements of the first charge pump in a series configuration and flying capacitive elements of the second charge pump in a parallel configuration; and during a second out-of-phase state of the power supply circuit, configuring the flying capacitive elements of the first charge pump in a parallel configuration and the flying capacitive elements of the second charge pump in a series configuration.

Aspect 19: The method of Aspect 17 or 18, wherein generating the voltage at the charge pump output node includes: during a first in-phase state of the power supply circuit, configuring flying capacitive elements of the first charge pump in a series configuration and flying capacitive elements of the second charge pump in a series configuration; and during a second in-phase state of the power supply circuit, configuring the flying capacitive elements of the first charge pump in a parallel configuration and the flying capacitive elements of the second charge pump in a parallel configuration.

Aspect 20: The method according to any of Aspects 16-19, wherein the first charge pump includes: a first series phase transistor; a first flying capacitive element, the first series phase transistor being coupled between the first flying capacitive element and a VIN node; a second series phase transistor; a second flying capacitive element, the second series phase transistor being coupled between the second flying capacitive element and the first flying capacitive element; and a third series phase transistor coupled between the second flying capacitive element and the charge pump output node.

Aspect 21: The method of Aspect 20, wherein the first charge pump further includes: a first parallel phase transistor coupled between the first series phase transistor and the charge pump output node; a second parallel phase transistor coupled between the second series phase transistor and the charge pump output node; a third parallel phase transistor coupled between the first flying capacitive element and a reference potential node of the power supply circuit; and a fourth parallel phase transistor coupled between the second flying capacitive element and the reference potential node of the power supply circuit.

Aspect 22: The method of Aspect 20 or 21, wherein the first charge pump further includes: a fourth series phase transistor; and a third flying capacitive element, wherein the third series phase transistor is coupled between the second flying capacitive element and the third flying capacitive element, and wherein the fourth series phase transistor is coupled between the third flying capacitive element and the charge pump output node.

Aspect 23: The method of Aspect 22, wherein the first charge pump further includes: a first parallel phase transistor coupled between the first series phase transistor and the charge pump output node; a second parallel phase transistor coupled between the second series phase transistor and the charge pump output node; a third parallel phase transistor coupled between the third series phase transistor and the charge pump output node; a fourth parallel phase transistor coupled between the first flying capacitive element and a reference potential node of the power supply circuit; a fifth parallel phase transistor coupled between the second flying capacitive element and the reference potential node of the power supply circuit; and a sixth parallel phase transistor coupled between the third flying capacitive element and the reference potential node of the power supply circuit.

Aspect 24: The method according to any of Aspects 21-23, wherein generating the voltage includes: turning on the first series phase transistor, the second series phase transistor, and the third series phase transistor during a first powering phase of the at least one powering phase; turning on the third series phase transistor and the fourth parallel phase transistor during a first freewheeling phase of the at least one freewheeling phase, the first freewheeling phase being after the first powering phase; turning on the first parallel phase transistor, the second parallel phase transistor, the third parallel phase transistor, and the fourth parallel phase transistor during a second powering phase of the at least one powering phase; and turning on the third series phase transistor and the fourth parallel phase transistor during a second freewheeling phase of the at least one freewheeling phase, the second freewheeling phase being after the second powering phase.

Aspect 25: A power supply device, comprising: a first charge pump coupled between an input voltage (VIN) node of the power supply device and a charge pump output node of a power supply circuit; an inductive element having a first terminal coupled to the charge pump output node and a second terminal coupled to an output voltage (VOUT) node of the power supply circuit; an output capacitive element coupled to the VOUT node of the power supply circuit; and logic configured to: control, during each of at least one powering phase of the power supply circuit, the first charge pump to generate a voltage at the charge pump output node of the power supply circuit based on an input voltage at the VIN node of the power supply circuit; and control, during each of at least one freewheeling phase of the power supply circuit, the first charge pump to couple the charge pump output node to a reference potential node of the power supply circuit after generating the voltage.

Aspect 26: The power supply circuit of Aspect 25, wherein, to generate the voltage, the logic is further configured to control, during each of the at least one powering phase, a second charge pump of the power supply circuit.

Aspect 27: The power supply circuit of Aspect 26, wherein, to generate the voltage, the logic is configured to: during a first out-of-phase state of the power supply circuit, control the first charge pump to configure flying capacitive elements of the first charge pump in a series configuration and control the second charge pump to configure flying capacitive elements of the second charge pump in a parallel configuration; and during a second out-of-phase state of the power supply circuit, control the first charge pump to configure the flying capacitive elements of the first charge pump in a parallel configuration and control the second charge pump to configure the flying capacitive elements of the second charge pump in a series configuration.

Aspect 28: The power supply circuit of Aspect 27, wherein, to generate the voltage, the logic is configured to: during a first in-phase state of the power supply circuit, control the first charge pump and the second charge pump to configure flying capacitive elements of the first charge pump in a series configuration and flying capacitive elements of the second charge pump in a series configuration; and during a second in-phase state of the power supply circuit, control the first charge pump and the second charge pump to configure the flying capacitive elements of the first charge pump in a parallel configuration and the flying capacitive elements of the second charge pump in a parallel configuration.

Additional Considerations

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A power supply circuit, comprising:
   a first series phase transistor coupled between an input voltage (VIN) node of the power supply circuit and a first flying capacitive element;
   a second series phase transistor coupled between the first flying capacitive element and a second flying capacitive element;
   a third series phase transistor coupled between the second flying capacitive element and a charge pump output node;
   a fourth series phase transistor coupled between the VIN node of the power supply circuit and a third flying capacitive element;
   a fifth series phase transistor coupled between the third flying capacitive element and a fourth flying capacitive element;
   a sixth series phase transistor coupled between the fourth flying capacitive element and the charge pump output node;
   a first parallel phase transistor coupled between the first series phase transistor and the charge pump output node;
   a second parallel phase transistor coupled between the second series phase transistor and the charge pump output node;
   a third parallel phase transistor coupled between the first flying capacitive element and a reference potential node of the power supply circuit;
   a fourth parallel phase transistor coupled between the second flying capacitive element and the reference potential node of the power supply circuit;
   a fifth parallel phase transistor coupled between the fourth series phase transistor and the charge pump output node;
   a sixth parallel phase transistor coupled between the fifth series phase transistor and the charge pump output node;
   a seventh parallel phase transistor coupled between the third flying capacitive element and the reference potential node of the power supply circuit;

an eighth parallel phase transistor coupled between the fourth flying capacitive element and the reference potential node of the power supply circuit; and
an inductive element coupled between the charge pump output node and an output voltage (VOUT) node of the power supply circuit.

2. The power supply circuit of claim 1, further comprising an output capacitive element coupled to the VOUT node of the power supply circuit.

3. The power supply circuit of claim 1, wherein:
during a first out-of-phase state of the power supply circuit, the first series phase transistor, the second series phase transistor, the third series phase transistor, the fifth parallel phase transistor, the sixth parallel phase transistor, the seventh parallel phase transistor, and the eighth parallel phase transistor are turned on; and
during a second out-of-phase state of the power supply circuit, the fourth series phase transistor, the fifth series phase transistor, the sixth series phase transistor, the first parallel phase transistor, the second parallel phase transistor, the third parallel phase transistor, and the fourth parallel phase transistor are turned on.

4. The power supply circuit of claim 1, wherein:
during a first in-phase state of the power supply circuit, the first series phase transistor, the second series phase transistor, the third series phase transistor, the fourth series phase transistor, the fifth series phase transistor, and the sixth series phase transistor are turned on; and
during a second in-phase state of the power supply circuit, the first parallel phase transistor, the second parallel phase transistor, the third parallel phase transistor, the fourth parallel phase transistor, the fifth parallel phase transistor, the sixth parallel phase transistor, the seventh parallel phase transistor, and the eighth parallel phase transistor are turned on.

5. The power supply circuit of claim 1, wherein during a freewheeling phase of the power supply circuit, the third series phase transistor and the fourth parallel phase transistor are turned on.

6. A method for operating a power supply circuit, comprising:
generating, via a first charge pump of the power supply circuit and during each of at least one powering phase of the power supply circuit, a voltage at a charge pump output node of the power supply circuit, based on an input voltage (VIN) of the power supply circuit, by
during a first powering phase of the at least one powering phase, turning on a first series phase transistor, a second series phase transistor, and a third series phase transistor;
after the first powering phase, turning on the third series phase transistor and a fourth parallel phase transistor during a first freewheeling phase of at least one freewheeling phase;
during a second powering phase of the at least one powering phase, turning on a first parallel phase transistor, a second parallel phase transistor, a third parallel phase transistor, and a fourth parallel phase transistor; and
after the second powering phase and during a second freewheeling phase of the at least one freewheeling phase, turning on the third series phase transistor and the fourth parallel phase transistor; and
coupling, during each of at least one freewheeling phase of the power supply circuit, the charge pump output node to a reference potential node after generating the voltage, wherein an inductive element is coupled between the charge pump output node and an output voltage (VOUT) node of the power supply circuit.

7. The method of claim 6, wherein the voltage is further generated via a second charge pump of the power supply circuit.

8. The method of claim 7, wherein generating the voltage at the charge pump output node includes:
during a first out-of-phase state of the power supply circuit, configuring flying capacitive elements of the first charge pump in a series configuration and flying capacitive elements of the second charge pump in a parallel configuration; and
during a second out-of-phase state of the power supply circuit, configuring the flying capacitive elements of the first charge pump in a parallel configuration and the flying capacitive elements of the second charge pump in a series configuration.

9. The method of claim 7, wherein generating the voltage at the charge pump output node includes:
during a first in-phase state of the power supply circuit, configuring flying capacitive elements of the first charge pump in a series configuration and flying capacitive elements of the second charge pump in a series configuration; and
during a second in-phase state of the power supply circuit, configuring the flying capacitive elements of the first charge pump in a parallel configuration and the flying capacitive elements of the second charge pump in a parallel configuration.

10. The method of claim 6, wherein:
the first series phase transistor is coupled between a first flying capacitive element and a VIN node;
the second series phase transistor is coupled between a second flying capacitive element and the first flying capacitive element; and
the third series phase transistor is coupled between the second flying capacitive element and the charge pump output node.

11. The method of claim 10, wherein:
the first parallel phase transistor coupled between the first series phase transistor and the charge pump output node;
the second parallel phase transistor is coupled between the second series phase transistor and the charge pump output node;
the third parallel phase transistor is coupled between the first flying capacitive element and a reference potential node of the power supply circuit; and
the fourth parallel phase transistor is coupled between the second flying capacitive element and the reference potential node of the power supply circuit.

12. The method of claim 10, wherein the first charge pump further includes:
a fourth series phase transistor; and
a third flying capacitive element, wherein the third series phase transistor is coupled between the second flying capacitive element and the third flying capacitive element, and wherein the fourth series phase transistor is coupled between the third flying capacitive element and the charge pump output node.

13. The method of claim 12, wherein the first charge pump further includes:
a fifth parallel phase transistor coupled between the second flying capacitive element and the reference potential node of the power supply circuit; and a sixth parallel phase transistor coupled between the third flying capacitive element and the reference potential node of the power supply circuit.

\* \* \* \* \*